United States Patent
Yokokawa et al.

(10) Patent No.: US 9,802,122 B2
(45) Date of Patent: Oct. 31, 2017

(54) INFORMATION PROCESSING APPARATUS, INFORMATION PROCESSING SYSTEM, INFORMATION PROCESSING METHOD, PROGRAM AND INFORMATION RECORDING MEDIUM

(71) Applicant: Sony Computer Entertainment Inc., Tokyo (JP)

(72) Inventors: Yutaka Yokokawa, Kanagawa (JP); Nicolas Doucet, Kanagawa (JP); Keiichiro Ishihara, Tokyo (JP)

(73) Assignee: Sony Interactive Enertainment Inc., Tokyo (JP)

( * ) Notice: Subject to any disclaimer, the term of this patent is extended or adjusted under 35 U.S.C. 154(b) by 94 days.

(21) Appl. No.: 14/065,495

(22) Filed: Oct. 29, 2013

(65) Prior Publication Data
US 2014/0125634 A1      May 8, 2014

(30) Foreign Application Priority Data
Nov. 6, 2012 (JP) ................................ 2012-244921

(51) Int. Cl.
    *G09G 5/00*          (2006.01)
    *A63F 13/428*      (2014.01)
    (Continued)

(52) U.S. Cl.
    CPC ........ *A63F 13/428* (2014.09); *A63F 13/2145* (2014.09); *A63F 13/426* (2014.09);
    (Continued)

(58) Field of Classification Search
    CPC ...... A63F 13/12; A63F 13/20; A63F 13/2145; A63F 13/23; A63F 13/235; A63F 13/31; A63F 13/426; A63F 13/428; G06F 3/011
    (Continued)

(56) References Cited

U.S. PATENT DOCUMENTS 6,572,476 B2 *    6/2003    Shoji ........................ A63F 13/04
                                                              345/472
7,347,780 B1 *    3/2008    Best ......................... A63F 13/10
                                                                  463/1

(Continued)

FOREIGN PATENT DOCUMENTS

JP      2008307409 A      12/2008
JP      2011156259 A       8/2011
(Continued)

OTHER PUBLICATIONS

Office Action for corresponding JP Application No. 2012-244921, 11 pages, dated Oct. 4, 2016.

*Primary Examiner* — Jason Mandeville
(74) *Attorney, Agent, or Firm* — Matthew B. Dernier, Esq.

(57) ABSTRACT

Disclosed herein is an information processing apparatus, including: an image acceptance section configured to accept an image of an operation inputting apparatus picked up by an imaging section; an operation signal acceptance section configured to accept an operation signal representative of an operation for the operation inputting apparatus from the operation inputting apparatus; and a process execution section configured to execute a process in response to the position of the operation inputting apparatus in the image accepted by the image acceptance section and the operation signal accepted by the operation signal acceptance section.

16 Claims, 21 Drawing Sheets

(51) Int. Cl.
*G06F 3/01* (2006.01)
*A63F 13/426* (2014.01)
*A63F 13/2145* (2014.01)
*A63F 13/23* (2014.01)
*A63F 13/31* (2014.01)
*A63F 13/20* (2014.01)

(52) U.S. Cl.
CPC .............. *G06F 3/011* (2013.01); *A63F 13/20* (2014.09); *A63F 13/23* (2014.09); *A63F 13/31* (2014.09)

(58) Field of Classification Search
USPC ... 345/175, 156, 158, 169, 173, 2.1, 2.2, 2.3
See application file for complete search history.

(56) References Cited

U.S. PATENT DOCUMENTS

| | | | | |
|---|---|---|---|---|
| 7,810,039 | B2* | 10/2010 | Yamamoto | G06F 3/04845 715/243 |
| 8,317,615 | B2* | 11/2012 | Takeda | A63F 13/02 273/138.2 |
| 8,337,284 | B2* | 12/2012 | Nishimura | A63F 13/10 463/31 |
| 8,811,667 | B2* | 8/2014 | Kasahara | G06T 19/006 348/169 |
| 8,843,830 | B2* | 9/2014 | Eom | H04N 21/4858 345/1.2 |
| 9,086,724 | B2* | 7/2015 | Sakaguchi | G06F 3/01 |
| 2002/0041327 | A1* | 4/2002 | Hildreth | G06F 3/011 348/42 |
| 2005/0223333 | A1* | 10/2005 | Yamamoto | G06F 3/04845 715/765 |
| 2008/0001951 | A1* | 1/2008 | Marks | A63F 13/06 345/474 |
| 2009/0189975 | A1* | 7/2009 | Yanagita | H04N 13/0055 348/47 |
| 2009/0237491 | A1* | 9/2009 | Saito | G01C 11/06 348/47 |
| 2010/0079579 | A1* | 4/2010 | Kikuchi | H04N 13/0022 348/43 |
| 2010/0105475 | A1* | 4/2010 | Mikhailov | A63F 13/06 463/33 |
| 2010/0150404 | A1* | 6/2010 | Marks | G06T 7/0018 382/107 |
| 2012/0086630 | A1* | 4/2012 | Zhu | A63F 13/10 345/156 |
| 2013/0300828 | A1* | 11/2013 | Yamato | G03B 35/08 348/44 |

FOREIGN PATENT DOCUMENTS

JP 2012507068 A 3/2012
WO 2010051089 A1 5/2010

* cited by examiner

INFORMATION PROCESSING APPARATUS, INFORMATION PROCESSING SYSTEM, INFORMATION PROCESSING METHOD, PROGRAM AND INFORMATION RECORDING MEDIUM

BACKGROUND

The present disclosure relates to an information processing apparatus, an information processing system, an information processing method, a program and an information recording medium.

An information processing apparatus such as a game apparatus is available wherein images of a player are successively picked up by an imaging section disposed on a display unit on which an image produced by execution of a game program is displayed. In the information processing apparatus, an action of the player is specified based on a difference between images of the player, and a process is executed in response to the action.

Also an information processing apparatus such as a game apparatus is available which executes a process in response to the position of a marker disposed in a space in advance in an image picked up by an imaging section provided in an operation inputting apparatus such as a controller.

SUMMARY

In the known apparatus, in order to execute a process wherein an operation carried out for the operation inputting apparatus and the position of the operation inputting apparatus work interact, the operation inputting apparatus includes an imaging section which is used in the process.

It is desirable to make it possible to execute a process in response to a combination of an operation for an operation inputting apparatus and the position of the operation inputting apparatus upon the operation. Where the operation inputting apparatus does not include an imaging section, preferably the process can be executed without additional provision of an imaging section. On the other hand, where the operation inputting apparatus includes an imaging section, preferably the process can be executed without using the imaging section provided in the operation inputting apparatus.

According to a first embodiment of the present disclosure, there is provided an information processing apparatus including an image acceptance section configured to accept an image of an operation inputting apparatus picked up by an imaging section, an operation signal acceptance section configured to accept an operation signal representative of an operation for the operation inputting apparatus from the operation inputting apparatus, and a process execution section configured to execute a process in response to the position of the operation inputting apparatus in the image accepted by the image acceptance section and the operation signal accepted by the operation signal acceptance section.

According to a second embodiment of the present disclosure, there is provided an information processing system including an information processing apparatus, and a plurality of operation inputting apparatus, the operation inputting apparatus individually including light emitting sections which emit light of colors different from each other, the information processing apparatus including an image acceptance section configured to accept an image of the plurality of different operation inputting apparatus picked up by an imaging section, an operation signal acceptance section configured to accept an operation signal associated with identification information of each of the operation inputting apparatus and representative of an operation for the operation inputting apparatus from the operation inputting apparatus, and a process execution section configured to execute a process in response to the operation signal and the position of the light emitting section of the color associated with the operation inputting apparatus of the outputting source of the operation signal in the image accepted by the image acceptance section.

According to a third embodiment of the present disclosure, there is provided an information processing method including accepting an image of an operation inputting apparatus picked up by an imaging section, accepting an operation signal representative of an operation for the operation inputting apparatus from the operation inputting apparatus, and executing a process in response to the position of the operation inputting apparatus in the accepted image and the accepted operation signal.

According to a fourth embodiment of the present disclosure, there is provided a program for causing a computer to function as an image acceptance section configured to accept an image of an operation inputting apparatus picked up by an imaging section, an operation signal acceptance section configured to accept an operation signal representative of an operation for the operation inputting apparatus from the operation inputting apparatus, and a process execution section configured to execute a process in response to the position of the operation inputting apparatus in the image accepted by the image acceptance section and the operation signal accepted by the operation signal acceptance section.

According to a fifth embodiment of the present disclosure, there is provided an information recording medium on or in which a program is recorded, the program causing a computer to function as an image acceptance section configured to accept an image of an operation inputting apparatus picked up by an imaging section, an operation signal acceptance section configured to accept an operation signal representative of an operation for the operation inputting apparatus from the operation inputting apparatus, and a process execution section configured to execute a process in response to the position of the operation inputting apparatus in the image accepted by the image acceptance section and the operation signal accepted by the operation signal acceptance section.

The above and other objects, features and advantages of the present disclosure will become apparent from the following description and the appended claims, taken in conjunction with the accompanying drawings in which like parts or elements denoted by like reference characters.

DETAILED DESCRIPTION OF THE PREFERRED EMBODIMENT

In the following, an embodiment of the present disclosure is described in detail with reference to the accompanying drawings.

Figure 1:
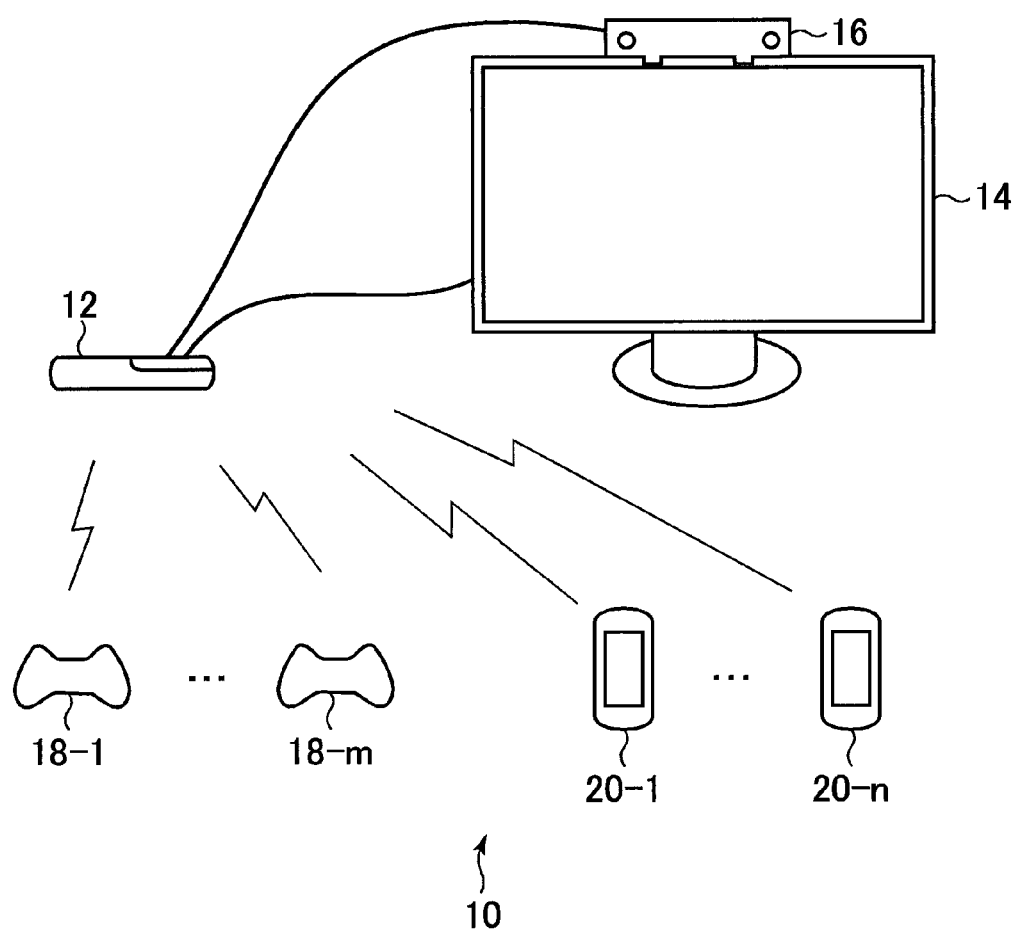
FIG. 1 is a schematic view showing a general configuration of a game system according to an embodiment of the present disclosure.

FIG. 1 schematically shows a general configuration of a game system 10 which is an example of an information processing system according to an embodiment of the present disclosure. Referring to FIG. 1, the game system 10 according to the present embodiment includes a game apparatus 12 which is an example of an information processing apparatus according to the present embodiment, a display unit 14 such as a television receiver for home use and having a speaker and so forth built therein, and a stereo camera 16. The game system 10 further includes a controller 18 (18-1 to 18-m) which is an example of an operation inputting apparatus according to the present embodiment, and a smartphone 20 (20-1 to 20-n) which is another example of the operation inputting apparatus according to the present embodiment. It is to be noted that, a personal computer, a tablet terminal or the like may be used as the information terminal described hereinabove in place of the smartphone 20.

In the present embodiment, the game apparatus 12 and the display unit 14 are connected to each other through a cable such as, for example, an AV cable or an HDMI (registered trademark) (High-Definition Multimedia Interface) cable. Meanwhile, the game apparatus 12 and the stereo camera 16 are connected to each other through a cable such as, for example, a USB (Universal Serial Bus) (for example, USB3.0) cable, an AV cable or an HDMI cable.

The game apparatus 12 includes, for example, a control section such as an MPU (Micro Processing Unit) which operates in accordance with a program installed in the game apparatus 12, and a storage section in the form of a storage device such as a ROM (Read Only Memory) or a RAM (Random Access Memory), a hard disk drive or a like element. The game apparatus 12 further includes an image processing section configured from a GPU (Graphical Processing Unit) and a frame buffer, and a sound processing section configured from an SPU (Sound Processing Unit) and a sound buffer. The game apparatus 12 further includes a communication section in the form of a network board, a wireless LAN (Local Area Network) module or the like which communicates data with a server (not shown) on the Internet, the controller 18, smartphone 20 and so forth by wire communication or wireless communication. The game apparatus 12 further includes an optical disk drive for reading an optical disk, which is a computer-readable information recording medium, such as a DVD (Digital Versatile Disc)-ROM or a Blu-ray (registered trademark) disk, a USB port, an HDMI port and so forth. The components of the game apparatus 12 are connected to each other for transfer of data therebetween through a bus.

The GPU included in the image processing section draws various screen images in the frame buffer included in the image processing section based on image data supplied thereto from the control section. A screen image formed in the frame buffer is converted into a video signal at a predetermined timing and outputted to the display unit 14.

Into the sound buffer included in the sound processing section, various sound data such as game music, game sound effects, messages and so forth read out from an optical disk or a hard disk are stored. The SPU included in the sound processing section reproduces such sound data and outputs the reproduced sound data, for example, from the speaker built in the display unit 14 or the speaker built in the controller 18.

The stereo camera 16 includes digital cameras disposed in a leftwardly and rightwardly juxtaposed relationship from each other and each configured from a lens, an imaging element and so forth. The digital cameras pick up an image after every predetermined interval of time such as, for example, after every 1/60 second and output the picked up images to the game apparatus 12. The stereo camera 16 includes a USB port.

The controller 18 is an operation inputting apparatus in the present embodiment, namely, an inputting and outputting apparatus, and transmits a signal corresponding to an operation carried out for the controller 18 by a user to the game apparatus 12. The controller 18 has various elements built therein including direction keys, buttons, a touch sensor, an analog stick, a speaker and various sensors such as an acceleration sensor and a gyro sensor utilized for detection of a posture or a movement of the controller 18. Also a battery and so forth are built in the controller 18. Further, the controller 18 in the present embodiment includes a vibrator. Therefore, the controller 18 in the present embodiment can output vibration.

The controller 18 can communicate with the game apparatus 12. As shown in FIG. 1, the controller 18 is connected to the game apparatus 12 by wireless communication, namely, wireless communication in accordance with a communication standard such as, for example, the Bluetooth (registered trademark). However, the controller 18 may be connected to the game apparatus 12 otherwise by wire communication.

The control section of the game apparatus 12 in the present embodiment scans the components of the controller 18 after every predetermined interval of time such as, for example, after every 1/60 second. Then, the control section decides the contents of an operation carried out by the user based on states of the components acquired through the scanning. It is to be noted that the game apparatus 12 is configured for connection to a plurality of controllers 18, and the control section executes various processes based on operation states inputted from the controllers 18.

Figure 2A:
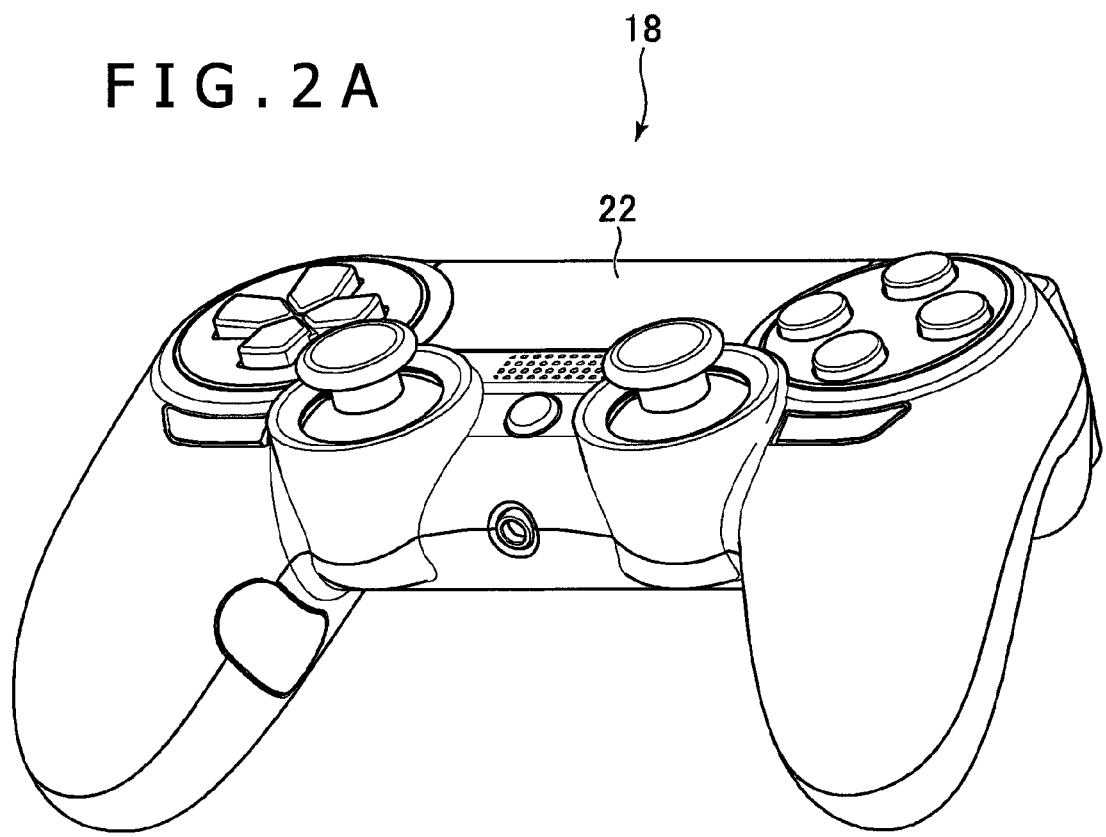
FIG. 2A is a perspective view showing an example of an appearance of a controller of the game system of FIG. 1 as viewed from an obliquely upper side.
Figure 2B:
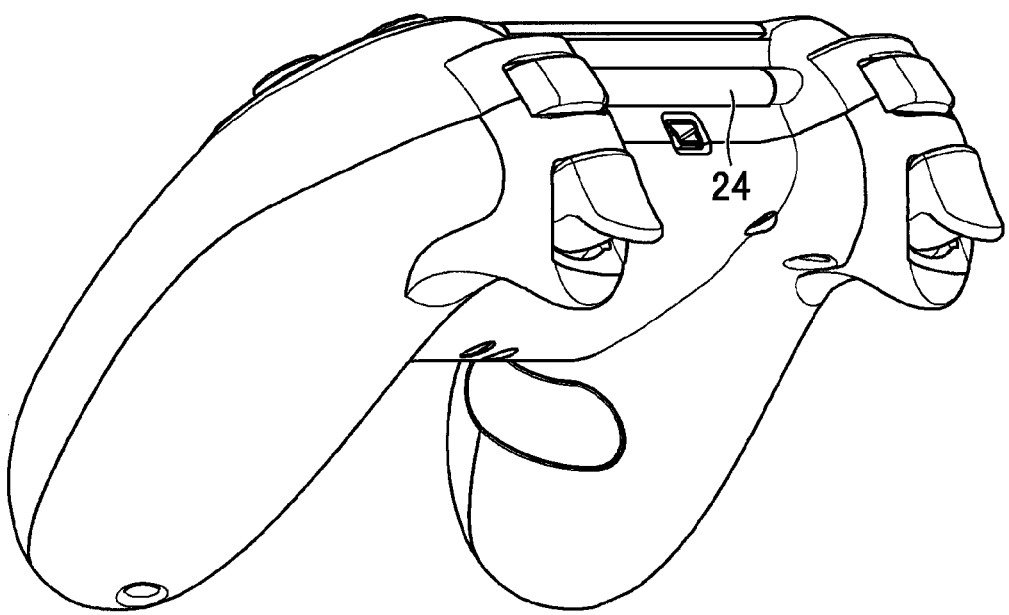
FIG. 2B is a perspective view showing an example of an appearance of the controller of FIG. 2A as viewed from an obliquely front side.

FIG. 2A shows an example of an appearance of the controller 18 in the present embodiment as viewed obliquely from the upper side. FIG. 2B shows an example of another appearance of the controller 18 in the present embodiment as viewed obliquely from the front side.

Referring to FIGS. 2A and 2B, the controller 18 has holding object portions provided at left and right portions thereof for being held by the user. Direction keys are disposed on an upper face of the left side holding object portion. Buttons are disposed on an upper face of the right side holding object portion. Further, in the controller 18 according to the present embodiment, various buttons are disposed in addition to those on the upper face of the right side holding object portion. Further, on the surface of a housing of the controller 18 according to the present embodiment, two analog sticks which are stick-shaped operation members erected uprightly are disposed. The analog sticks can be tilted in all directions from the uprightly erected posture to a predetermined angle. Here, the longitudinal direction of the housing of the controller 18 is defined as X-axis direction and the depthwise direction of the housing perpendicular to the X-axis direction is defined as Y-axis direction. In this instance, the posture, namely, the operation state, of each analog stick is detected as tilts in the X-axis direction and the Y-axis direction, namely, as posture data (X, Y). Then, the posture data (X, Y) are transmitted as a signal representative of digital values of 0 to 255 to the game apparatus 12.

A plate-shaped operation member 22 including a panel, and a touch sensor is disposed on an upper face of a central portion of the controller 18 which interconnects a front portion of the left side holding object portion and a front portion of the right side holding object portion. The panel fully covers the touch sensor, and the touch sensor is attached to a lower face, namely, a reverse face, of the panel. The touch sensor can detect the position of an object such as a finger of the user or a stylus on a detection face thereof, in the present embodiment, on an upper face of the plate-shaped operation member 22. The touch sensor outputs a signal corresponding to the detected position of the object. The controller 18 transmits the signal to the game apparatus 12.

The touch sensor is, in the present embodiment, for example, a sensor of the capacitance type. The touch sensor is ready for so-called multi touches and can detect a plurality of positions of objects on the detection face thereof at the same time. The plate-shaped operation member 22 is supported for upward and downward movement in response to a depression operation by the user. The controller 18 includes a switch for detecting that the plate-shaped operation member 22 is depressed and functions as a button which allows on/off operations.

Referring to FIG. 2B, a light emitting section 24 is provided on the front face of the central portion of the controller 18 which interconnects the front portion of the left side holding object portion and the front portion of the right side holding object portion. The light emitting section 24 is positioned between a projection of the left side holding object portion and a projection of the right side holding object portion. The light emitting section 24 has a shape elongated in the leftward and rightward direction. In the example of FIG. 2B, the light emitting section 24 has a shape of a bar extending linearly. It is to be noted that the shape of the light emitting section 24 is not limited to this but may be, for example, a V shape or an arcuately curved shape.

The game apparatus 12 according to the present embodiment acquires light of the light emitting section 24 through the stereo camera 16. The game apparatus 12 carries out image processing for images acquired through the stereo camera 16 and detects the position of the controller 18 based on the position and the size of the light emitting section 24 in the acquired image.

The light emitting section 24 can emit light of an arbitrary color. For example, the light emitting section 24 includes light emitting elements such as light emitting diodes of red, green and blue and emits light of a color designated by the game apparatus 12 or a color representative of an operation state of the controller 18 by adjusting the luminance of the light emitting elements. Therefore, even where a plurality of controllers 18 are used at the same time, the game apparatus 12 can detect the position of each controller 18.

Further, the controller 18 according to the present embodiment has a built-in speaker provided at the central portion thereof which interconnects the front portion of the left side holding object portion and the front portion of the right side holding object portion. At a position of the upper face of the central portion corresponding to the speaker, a sound passing hole is formed. It is to be noted that a microphone may be disposed together with or in place of the speaker at the position of the sound passing hole.

Figure 3:
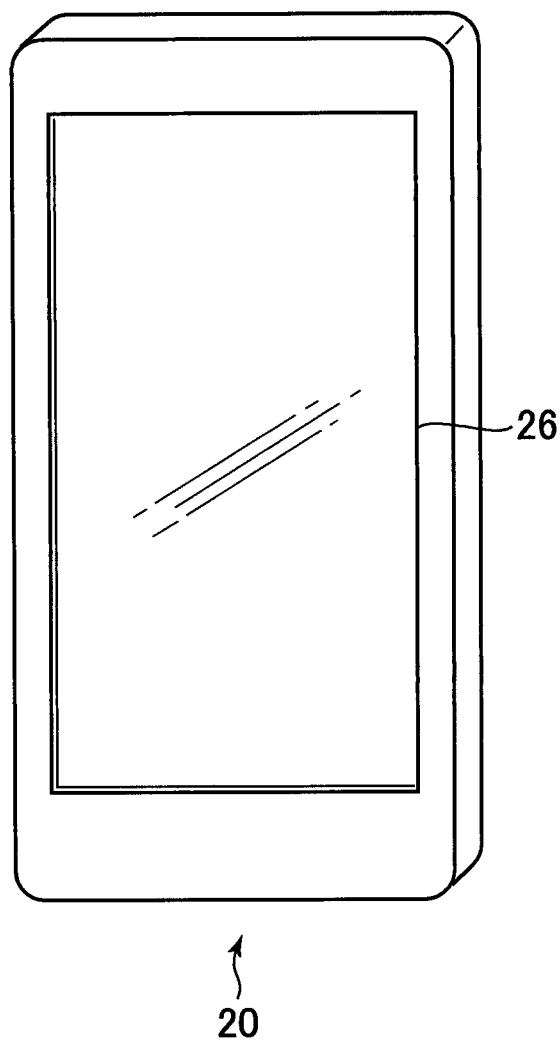
FIG. 3 is a perspective view showing an example of an appearance of a smartphone according to the embodiment of the present disclosure.

Further, in the present embodiment, the smartphone 20 can be used as an operation inputting apparatus to the game apparatus 12 similarly to the controller 18. FIG. 3 shows an example of an appearance of the smartphone 20 according to the present embodiment. Referring to FIG. 3, the smartphone 20 according to the present embodiment includes a touch panel 26 provided on a front face thereof. The touch panel 26 is a sensor which can detect the position of an object such as a finger of the user or a stylus on the detection face thereof and outputs a signal corresponding to the detected position of the object. Further, the smartphone 20 according to the present embodiment further includes a control section such as a CPU (Central Processing Unit) which operates in accordance with a program installed in the smartphone 20, a storage section in the form of a flash memory or the like, a communication section such as a network board, a speaker, a gyro sensor and so forth. It is to be noted that the smartphone 20 may include an acceleration sensor.

Figure 4:
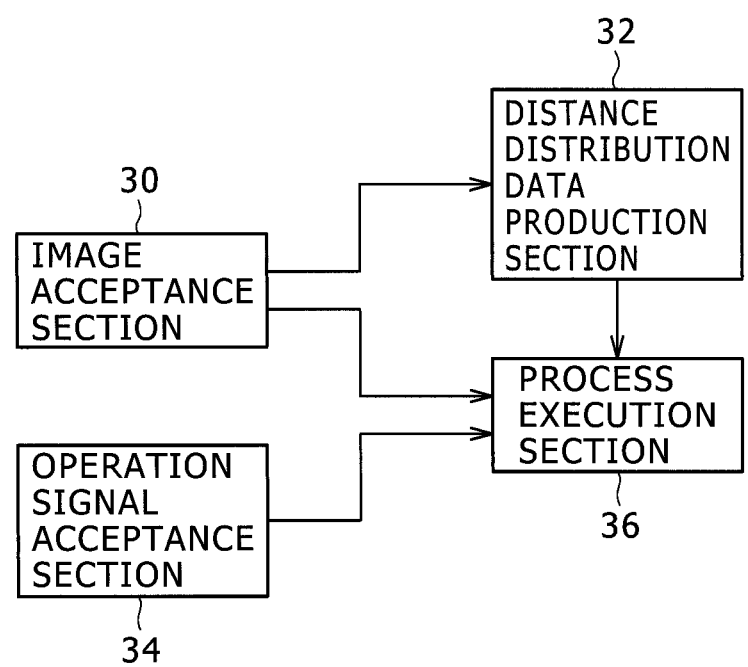
FIG. 4 is a functional block diagram illustrating an example of functions of the game machine of FIGS. 2A and 2B.

FIG. 4 shows an example of functions incorporated in the game apparatus 12 according to the present embodiment. Referring to FIG. 4, the game apparatus 12 according to the present embodiment includes, for example, an image acceptance section 30, a distance distribution data production section 32, an operation signal acceptance section 34 and a process execution section 36 as functioning components thereof. The functions mentioned are implemented by execution of a program according to the present embodiment. The program includes instructions for controlling a computer to act as the functions illustrated in FIG. 4. The program may be downloaded from some other computer through a communication interface via a computer communication network and provided to the game apparatus 12. Or, the program may be stored in a computer-readable information recording medium such as an optical disk such as, for example, a CD-ROM, a DVD-ROM or a Blu-ray disk, a USB memory or a memory card such that it is provided from the information recording medium to the game apparatus 12.

The image acceptance section 30 accepts, in the present embodiment, images picked up or produced by the two imaging sections disposed in a leftwardly and rightwardly juxtaposed relationship with each other in the stereo camera 16 and outputted from the stereo camera 16 after every predetermined interval of time. The image acceptance section 30 stores the accepted images into the storage section of the game apparatus 12.

The distance distribution data production section 32 produces distance distribution data based on the images accepted by the image acceptance section 30. The distance distribution data represent a distribution of the distance between an imaging object and a plane formed from the front face of the stereo camera 16, more particularly, for example, of the length of a perpendicular line to the plane formed by the front face of the stereo camera 16 from the imaging object at imaging timings of the image.

The distance distribution data production section 32 in the present embodiment uses one of images picked up, namely, produced, individually by the two imaging sections disposed in a leftwardly and rightwardly juxtaposed relationship from each other in the stereo camera 16 and accepted by the image acceptance section 30 as a reference image and uses the other one of the images as a comparison image. Even if the two imaging sections pick up images of the same imaging object, the position of the imaging object in the reference image and the position of the imaging object in the comparison image are displaced from each other by a parallax between the two imaging sections. The distance distribution data production section 32 measures the displacement to specify the distance from the position of the stereo camera 16 to the imaging object.

The reference image is used, for example, for a specification process of a position of the controller 18 or the smartphone 20, a recognition process of an image of the face and so forth hereinafter described, and the comparison image is used to produce distance distribution data. In particular, for example, the distance distribution data production section 32 divides the reference image into a plurality of blocks and specifies, for each of the blocks, the distance to the imaging object in the block, for example, the distance from the plane formed by the front face of the stereo camera 16 to the imaging object, using the comparison image. Then, the distance distribution data production section 32 produces, based on results of such specification, distance distribution data by which the blocks and the distances of the imaging object in the blocks are associated with each other. Then, the distance distribution data production section 32 stores the produced distance distribution data in an associated relationship with the image on which the production of the distance distribution data is based into the storage section of the game apparatus 12.

The operation signal acceptance section 34 accepts an operation signal corresponding to an operation for an operation inputting apparatus, in the present embodiment, for the controller 18 or the smartphone 20, from the operation inputting apparatus.

The process execution section 36 executes various processes whose details are described below.

First Example of Utilization

In the following, a first example of utilization of the game system 10 according to the present embodiment is described.

Figure 5:
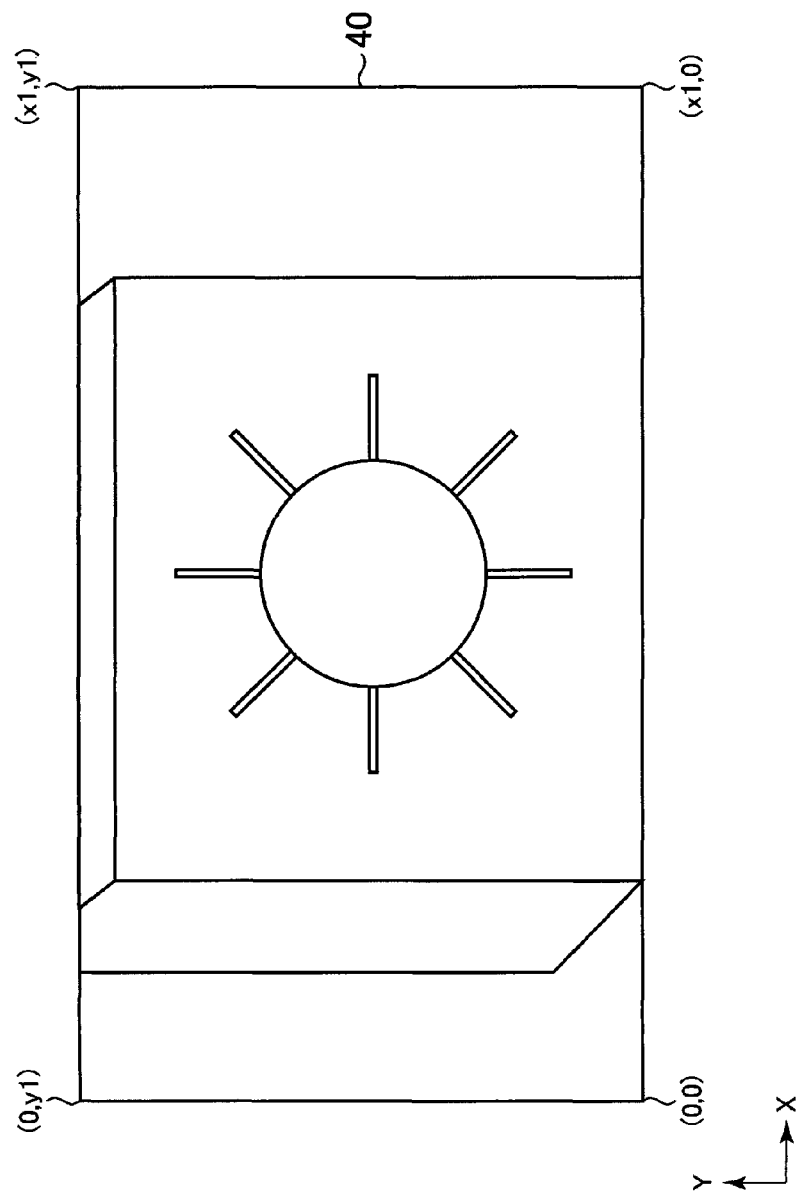
FIG. 5 is a schematic view showing an example of a virtual space image.

In the first example of utilization, the process execution section 36 controls so that an image in a three-dimensional virtual space exemplified in FIG. 5 is displayed on the display unit 14. Such an image as just mentioned is hereinafter referred to as virtual space image 40. In the virtual space image 40 exemplified in FIG. 5, a virtual object representative of a safe is disposed.

In the first example of utilization, a client program for the smartphone 20 used in the first example of utilization is installed in advance in the smartphone 20. The client program is transmitted from the game apparatus 12 to the smartphone 20, for example, in response to a download request transmitted from the smartphone 20 to the game apparatus 12. Then, if the smartphone 20 starts the program, then an image of a graphic determined in advance is displayed on the touch panel 26. Such an image as just mentioned is hereinafter referred to as code image 42 (refer to FIG. 6).

Figure 6:
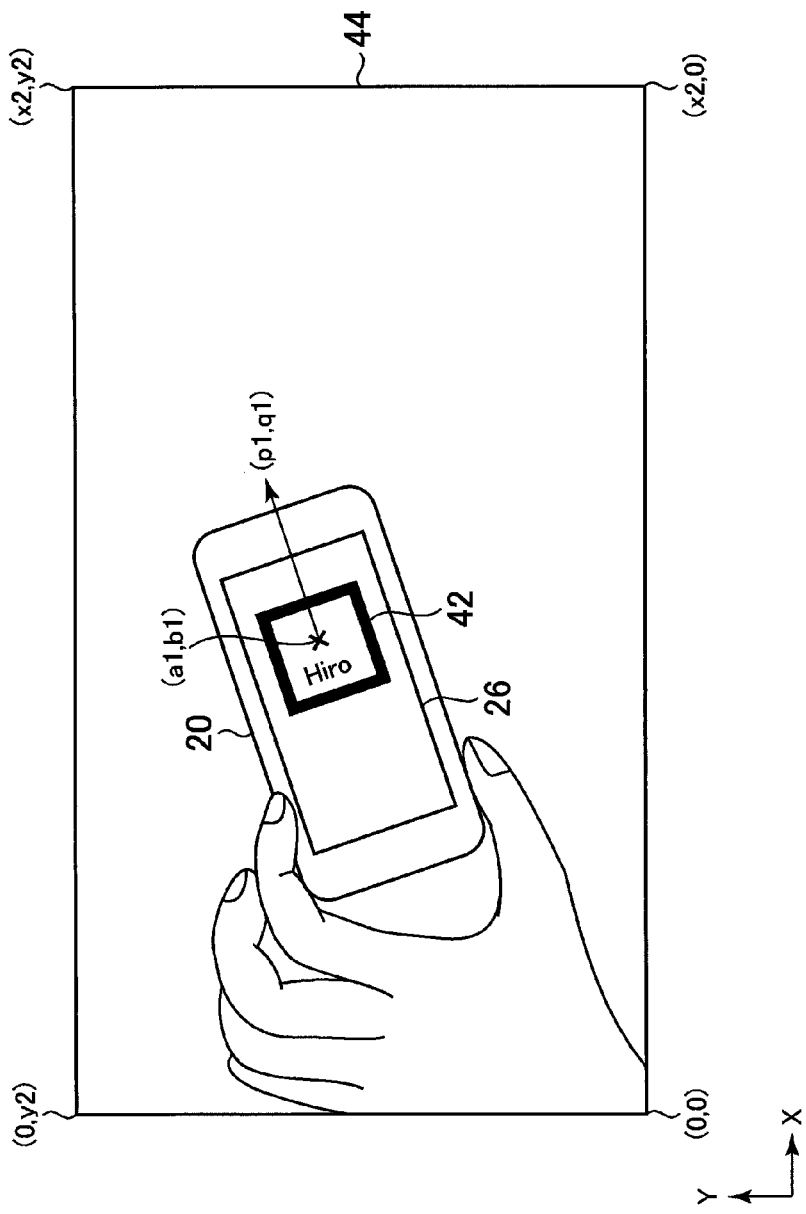
FIG. 6 is a view showing an example of a picked up image.

FIG. 6 shows an example of an image picked up by the stereo camera 16 when the user holds the smartphone 20 by hand with a code image 42 displayed on the touch panel 26 and the face of the smartphone 20 on which the touch panel 26 is disposed is directed to the stereo camera 16. The image picked up by the stereo camera 16 is hereinafter referred to as picked up image 44. It is to be noted that the picked up image 44 corresponds to the reference image described hereinabove. However, as the picked up image 44, any of an image picked up by the imaging section disposed on the left side of the stereo camera 16 and another image picked up by the imaging section disposed on the right side of the stereo camera 16 may be used.

As seen in FIG. 6, in the first example of utilization, the code image 42 is included in part of the picked up image 44. Further, in the first example of utilization, the image acceptance section 30 accepts the picked up image 44 at predetermined time intervals as described hereinabove.

Figure 7:
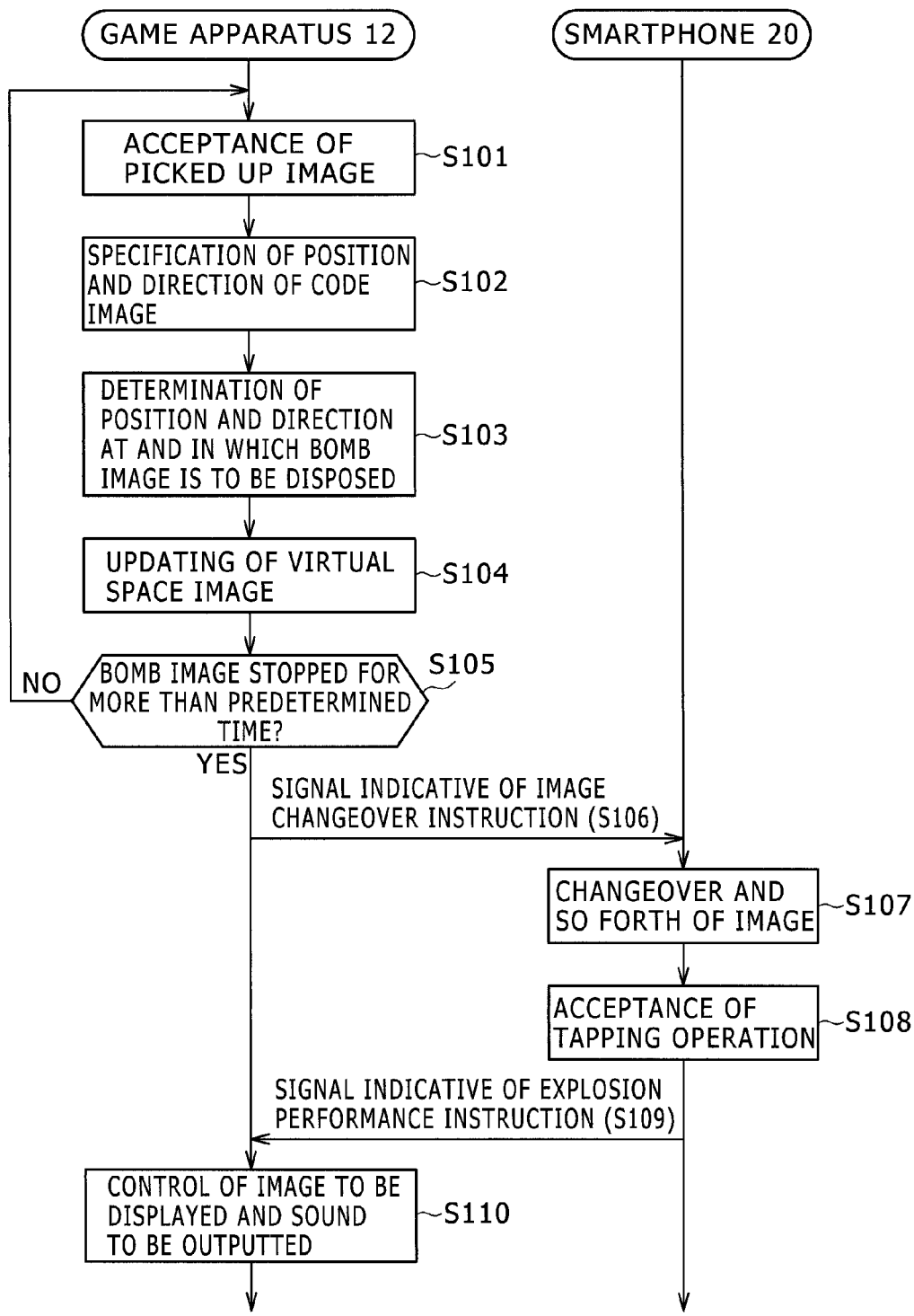
FIG. 7 is a flow chart illustrating an example of a flow of processing carried out by the game system of FIG. 1.

An example of a flow of processing carried out by the game system 10 according to the present embodiment in the first example of utilization is described with reference to a flow chart exemplified in FIG. 7. It is to be noted that, in the following description, in regard to the virtual space image 40 and the picked up image 44, the rightward direction is defined as X-axis positive direction, and the upward direction is defined as Y-axis positive direction. Further, the coordinate values of the left lower end point of the virtual space image 40 are defined as (0, 0); the coordinate values of the right lower end portion of the virtual space image 40 as (x1, 0); the coordinate values of the left upper end point of the virtual space image 40 as (0, y1); and the coordinate values of the right upper point of the virtual space image 40 as (x1, y1). Further, the coordinate values of the left lower end point of the picked up image 44 are defined as (0, 0); the coordinate values of the right lower end point of the picked up image 44 as (x2, 0); the coordinate values of the left upper point of the picked up image 44 as (0, y2); and the coordinate values of the right upper end point of the picked up image 44 as (x2, y2). Further, it is assumed that, in the first example of utilization, the virtual space image 40 and the picked up image 44 have an equal aspect ratio. However, the virtual space image 40 and the picked up image 44 need not have an equal aspect ratio.

First, the image acceptance section 30 accepts the picked up image 44 from the stereo camera 16 at step S101. Then at step S102, the process execution section 36 specifies the position and the direction of the code image 42 in the accepted picked up image 44. In the present example of processing, the process execution section 36 specifies, for example, coordinate values (a1, b1) of a representative point such as, for example, the point of gravity in the code image 42 and a vector (p1, q1) representative of a direction in which the code image 42 is disposed in the picked up image 44. For example, the process execution section 36 specifies a vector (p1, q1) representative of a direction from the bottom to the top of the code image 42. Here, the process execution section 36 specifies a vector of a direction obtained by rotating a direction from a position at which the first character included in a character string included in the code image 42 is disposed to a position at which the last character of the character string is disposed by 90 degrees in the counterclockwise direction as a vector (p1, q1) of the direction from the bottom to the top of the code image 42.

Then at step S103, the process execution section 36 determines the position and the direction in the virtual space image 40 at and in which a predetermined image is to be disposed based on the specified coordinate values (a1, b1) and vector (p1, q1). The predetermined image here is an image representative of a bomb and is hereinafter referred to as bomb image 46 (refer to FIG. 8). In the present processing example, the process execution section 36 determines, for example, coordinate values (x1−a1×x1/x2, b1×y1/y2) as coordinate values (a2, b2) of a representative point such as, for example, the center of gravity in the bomb image 46. Further, the process execution section 36 determines a vector (−p1, q1) as a vector (p2, q2) of a predetermined direction of the bomb image 46, here, a direction, for example, from the right to the left of the bomb image 46.

Figure 8:
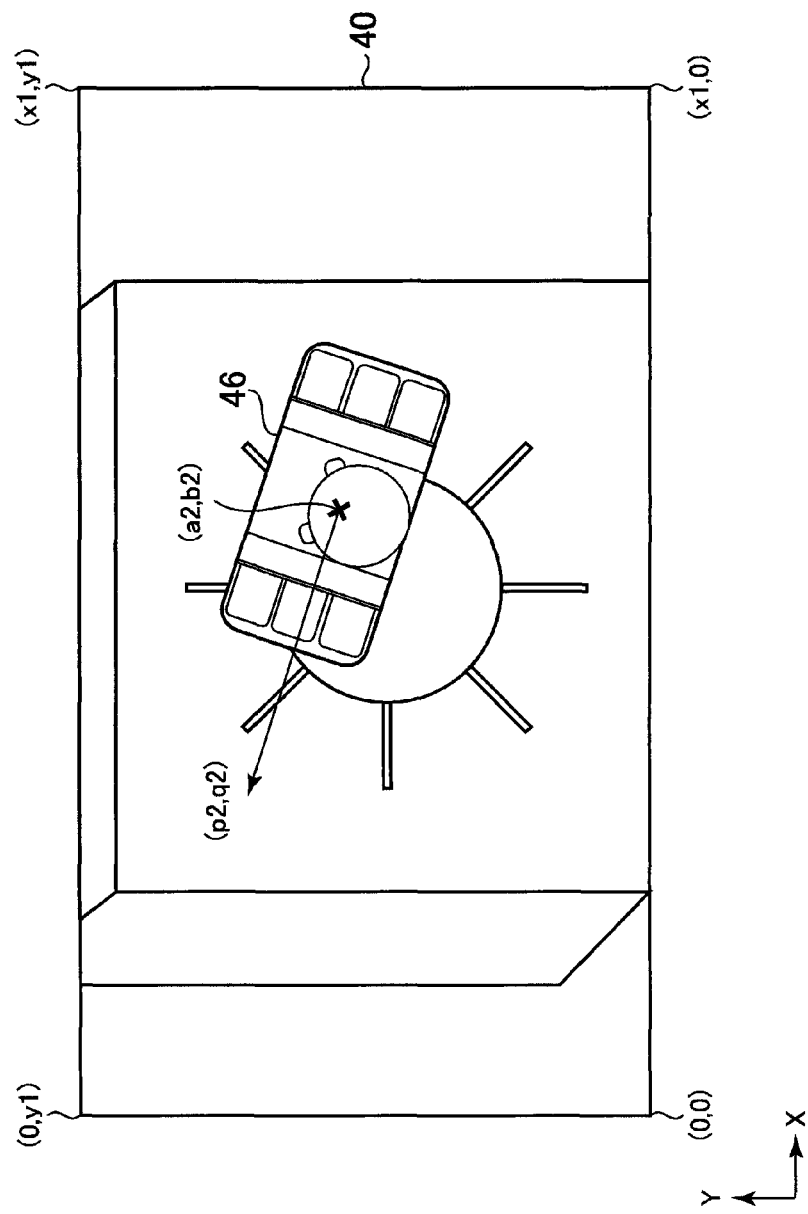
FIG. 8 is a schematic view showing another example of a virtual space image.

Then, the process execution section 36 produces a new virtual space image 40 representative of a manner in which the bomb image 46 is disposed in accordance with the position and the direction determined by the process at step S103 in the virtual space represented by the virtual space image 40. Then, the process execution section 36 updates the image displayed on the display unit 14 to the new virtual space image 40 at step S104. FIG. 8 shows an example of the virtual space image 40 in which the bomb image 46 is disposed.

Then at step S105, the process execution section 36 decides whether or not the bomb image 46 has remained stationary for a predetermined period of time such as, for example, three seconds. Here, for example, if the total value of the distance of movement of the center of gravity of the bomb image 46 in three seconds is lower than a predetermined value, then the process execution section 36 decides that the bomb image 46 has remained stationary. Then, if it is decided at step S105 that the bomb image 46 has not remained stationary, namely if the decision at step S105 is No (represented as N in FIG. 7), then the process execution section 36 executes the processes at the steps beginning with step S101 again. On the other hand, if it is decided at step S105 that the bomb image 46 has remained stationary, namely, if the decision at step S105 is Yes (represented as Y in FIG. 7), then the process execution section 36 transmits a signal representative of an image changeover instruction to the smartphone 20 at step S106.

Figure 9:
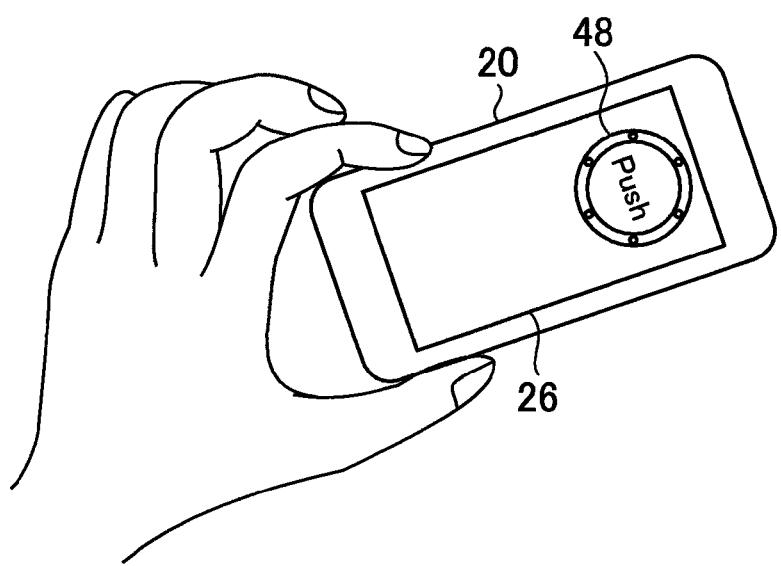
FIG. 9 is a schematic view illustrating an example of a manner in which an image displayed on a touch panel of the smartphone shown in FIG. 3 is changed over to a button image.

Thus, the smartphone 20 receives the signal representative of the image changeover instruction at step S106. After the image changeover instruction is received at step S106, the smartphone 20 changes over the image displayed on the touch panel 26 to such an image for an urging the user to carry out an inputting operation as exemplified in FIG. 9 at step S107. Here, the smartphone 20 changes over the display image, for example, to an image representative of a button, which is hereinafter referred to as button image 48. Further, at step S107, the smartphone 20 outputs sound representing that the image displayed on the touch panel 26 has been changed over from the speaker built in the smartphone 20. FIG. 9 illustrates an example of a manner in which the image displayed on the touch panel 26 of the smartphone 20 held by the user has been changed over to the button image 48. It is to be noted that, by the process at step S107, sound may be outputted not from the speaker built in the smartphone 20 but from the speaker provided in the display unit 14.

Thereafter, if the user carries out a tapping operation for the button image 48 displayed on the touch panel 26, then the smartphone 20 accepts the tapping operation at step S108 and then transmits a signal representative of an explosion performance instruction to the game apparatus 12 at step S109. Thus, at step S109, the operation signal acceptance section 34 of the game apparatus 12 receives the signal representative of the explosion performance instruction.

Figure 10:
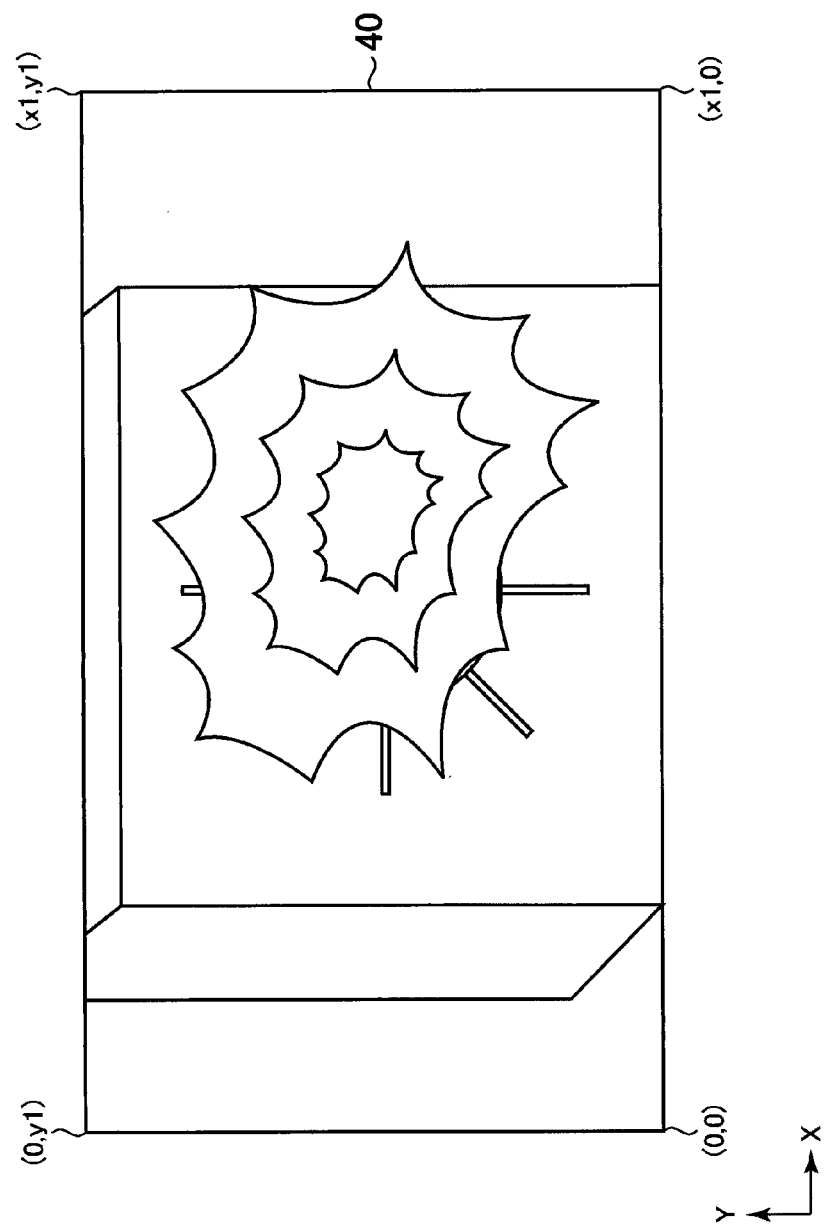
FIG. 10 is a schematic view showing a further example of a virtual space image.

After the signal representative of the explosion performance instruction is received by the process at step S109, the process execution section 36 controls, at step S110, the image to be displayed on the display unit 14, the sound to be outputted from the speaker built in the display unit 14 and so forth so that a performance that the bomb represented by the bomb image 46 disposed in the virtual space image 40 explodes may be carried out. In particular, the process execution section 36 controls so that a moving image illustrating a manner in which the bomb represented by the bomb image 46 disposed in the virtual space image 40 explodes may be displayed on the display unit 14, for example, as illustrated in FIG. 10. Further, the process execution section 36 controls so that explosion sound of the bomb may be outputted from the speaker built in the display unit 14. In this manner, in response to acceptance of a signal from the smartphone 20, the process execution section 36 executes a process indicated by the signal.

In the present embodiment, a relative disposition of the code image 42 in the picked up image 44 and a relative disposition of the bomb image 46 in the virtual space image 40 have a horizontally inverted relationship. Therefore, if the display unit 14 is viewed from the user who holds up the code image 42 toward the stereo camera 16, then the position and the direction of the bomb image 46 in the virtual space image 40 displayed on the display unit 14 are similar to those at and in which the smartphone 20 is held up. Therefore, the user can carry out an operation for disposing the bomb image 46 readily.

Further, in the present embodiment, when a predetermined image, in the present processing example, the code image 42, is displayed on the touch panel 26 of the smartphone 20, the position and the direction at and in which an image of an object, in the present processing example, the bomb image 46, displayed on the display unit 14 can be set by the user moving the smartphone 20. After the bomb image 46 is disposed and the image displayed on the touch panel 26 is changed over to the button image 48, the user can transmit a predetermined instruction, in the present processing example, an instruction to carry out a performance that the bomb represented by the bomb image 46 explodes, to the game apparatus 12. Such transmission can be carried out by carrying out a predetermined operation, in the present processing example, a tapping operation, for the touch panel 26 of the smartphone 20. In this manner, in the game system 10 in the present processing example, the smartphone 20 can play a plurality of roles which are different depending upon the situation.

It is to be noted that, in the present processing example, the distance distribution data production section 32 may produce distance distribution data based on picked up images 44 picked up by the two imaging sections. Then, the process execution section 36 may decide based on the distance distribution data whether or not the distance between the code image 42 and the stereo camera 16 may be equal to or lower than a predetermined value. Then, if it is decided that the distance between the code image 42 and the stereo camera 16 is not equal to or lower than the predetermined value, then the process execution section 36 may update the virtual space image 40 displayed on the display unit 14 so that a manner in which the bomb image 46 is not disposed in the virtual space may be represented, or in other words, so that a virtual space image 40 similar to that of FIG. 5 may be displayed. Further, in the process at step S102 described hereinabove, the process execution section 36 may specify three-dimensional coordinate values of a representative point in the code image 42 and a three-dimensional vector representative of a direction in which the code image 42 is disposed. In this instance, the specification by the process execution section 36 may be based on at least one of the picked up images 44, the distance distribution data and a result of measurement of an angular velocity by the gyro sensor transmitted from the smartphone 20. Further, in the process at step S103, the process execution section 36 may determine a position and a direction in the virtual space image 40 at and in which the predetermined image is to be disposed based on the three-dimensional coordinate values and three-dimensional vector. Further, when coordinate values of the representative point in the code image 42 or a vector representative of a direction in which the code image 42 is disposed is to be specified, the process execution section 36 may use a result of measurement by the acceleration sensor transmitted from the smartphone 20.

Second Example of Utilization

In the following, a second example of utilization of the game system 10 according to the present embodiment is described.

In the second example of utilization, the game apparatus 12 executes a game program of a shooting game in which the controllers 18 and the smartphone 20 are used as operation inputting apparatus.

Figure 11:
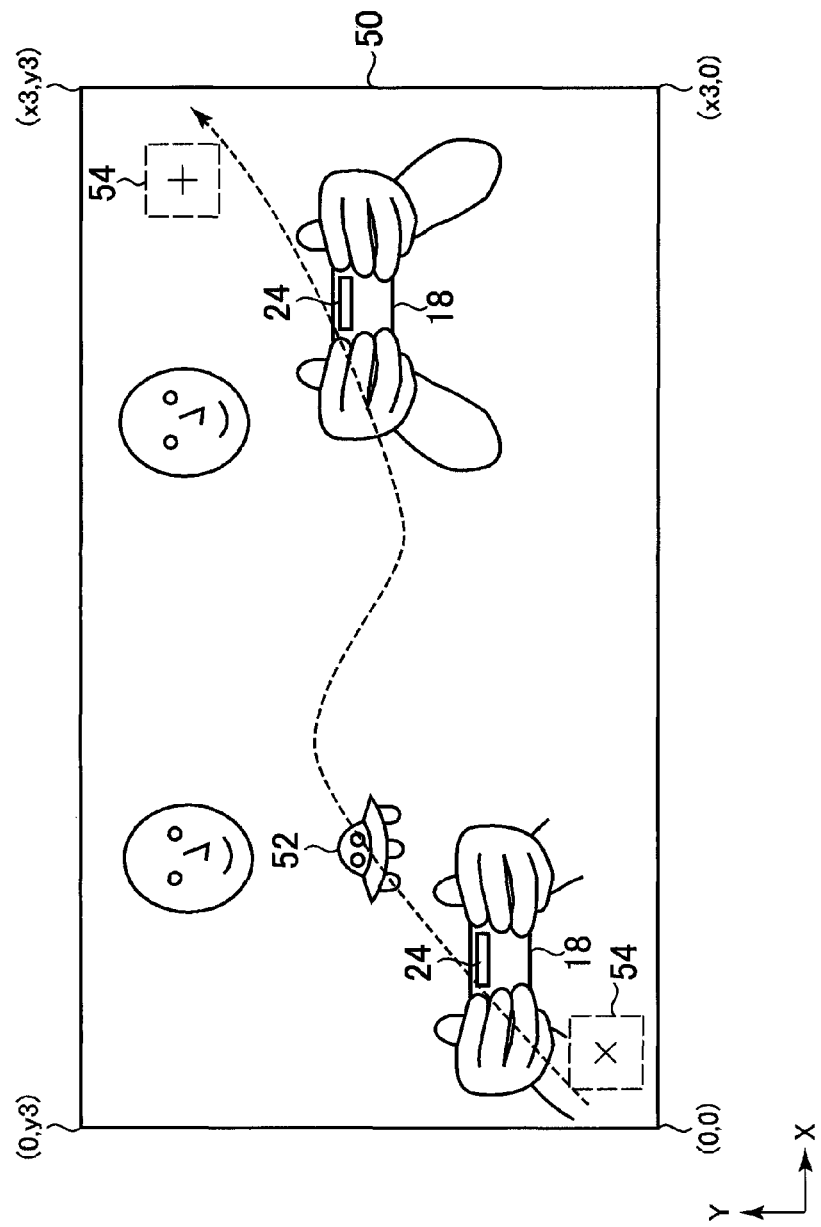
FIG. 11 is a schematic view showing an example of a play image.

FIG. 11 illustrates an example of an image displayed on the display unit 14 while the shooting game is played. Such an image as just described is hereinafter referred to as play image 50.

Figure 12:
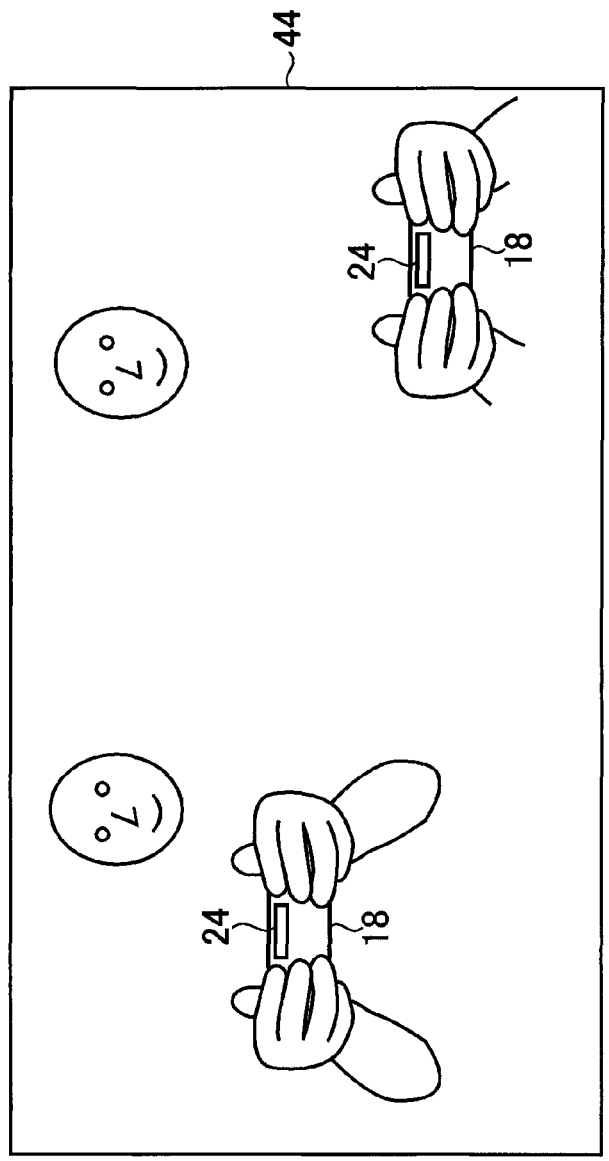
FIG. 12 is a schematic view showing another picked up image.

FIG. 12 shows an example of the picked up image 44 on which the play image 50 to be displayed on the display unit 14 is based. It is to be noted that the picked up image 44 corresponds to the reference image described hereinabove, and as the picked up image 44, whichever one of an image picked up by the imaging section disposed on the left side of the stereo camera 16 and another image picked up by the imaging section disposed on the right side of the stereo camera 16 may be used. In FIG. 12, only images of the controllers 18, images of the hands of users who operate the controllers 18 and images of the face of the users are shown, and any other image than the images mentioned is omitted. However, the picked up image 44 includes also images of the body of the users, an image of the background and so forth. As seen in FIG. 12, in the second example of utilization, an image of the light emitting section 24 of the controllers 18 is included in the picked up image 44.

The play image 50 includes an image obtained by horizontally inverting the picked up image 44 and carrying out expansion or reduction of the horizontally inverted image in response to a resolution of the display unit 14. The play image 50 further includes an image representative of a target object, in the present processing example, for example, an image representative of a UFO. The image just mentioned is hereinafter referred to as UFO image 52. The play image 50 further includes an aim image 54 representative of an aim for aiming at the target.

In the shooting game, two users would play against each other aiming to get a higher score. Then, the two users who play the shooting game would individually operate the controllers 18. In the second example of utilization, the light emitting sections 24 of the controllers 18 operated individually by the two users are set in advance so that they emit light of different colors from each other. For example, light of a red color is emitted from the light emitting section 24 of the controller 18 of the user on the left side of the play image 50, namely, of the user on the right side of the picked up image 44. The user mentioned is hereinafter referred to as first user. On the other hand, light of a blue color is emitted from the light emitting section 24 of the controller 18 of the user on the right side of the play image 50, namely, on the left side of the picked up image 44. The user just mentioned is hereinafter referred to as second user.

Figure 13:
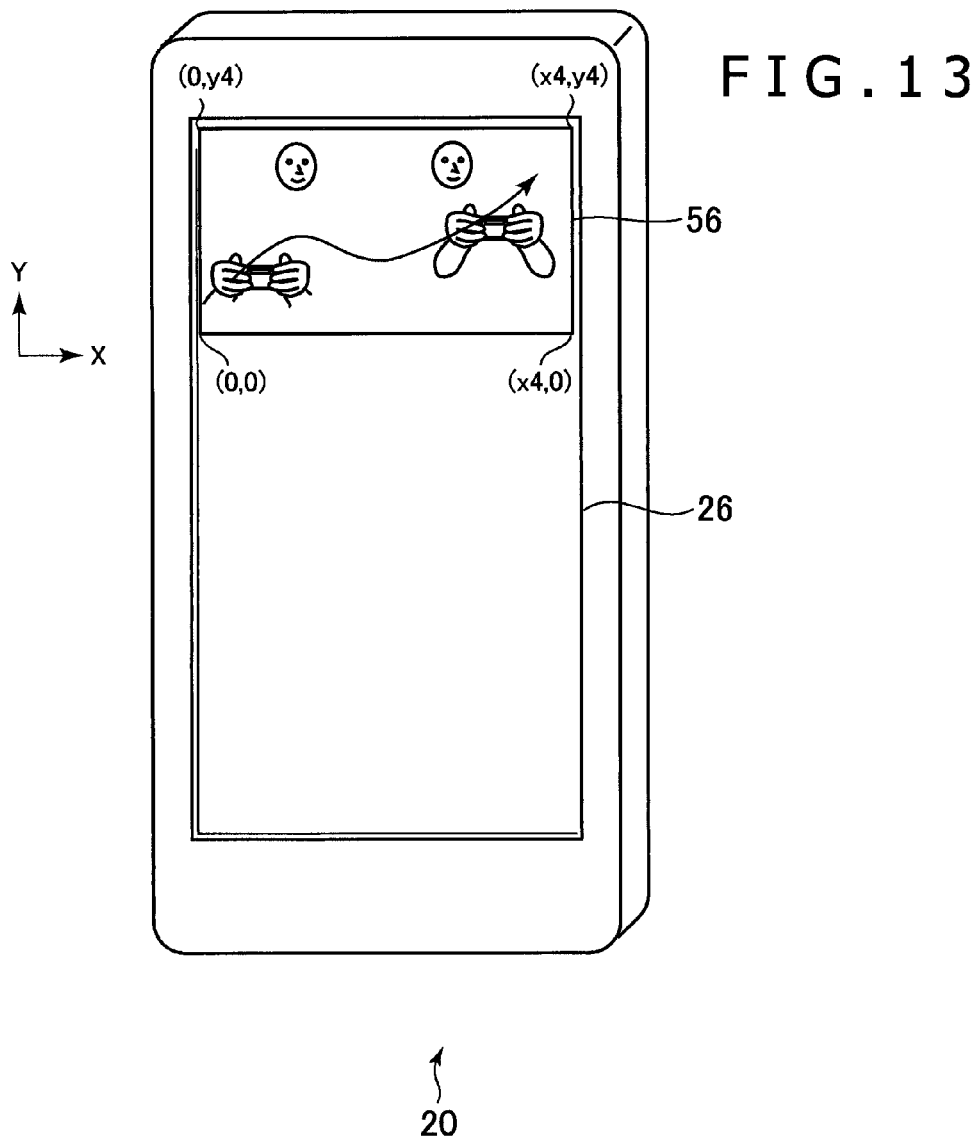
FIG. 13 is a perspective view showing another example of an appearance of the smartphone of FIG. 3.

Separately from the two users described above, also a user who operates a smartphone 20 takes part in the game. The user just mentioned is hereinafter referred to as third user. The third user can operate the smartphone 20 to control the movement of the UFO image 52. FIG. 13 shows an example of an appearance of the smartphone 20 operated by the third user. In the present processing example, the process execution section 36 of the game apparatus 12 transmits an image obtained by horizontally inverting the picked up image 44 and then reducing the resulting image to the smartphone 20. The image obtained here is hereinafter referred to as reduced inverted image 56. Here, the reduced inverted image 56 may be an image obtained by horizontally inverting the picked up image 44 and then reducing the resulting image with its aspect ratio maintained. Then, the smartphone 20 receives the reduced inverted image 56 and controls so that the reduced inverted image 56 may be displayed on the touch panel 26. The reduced inverted image 56 is displayed on the touch panel 26 of the smartphone 20 in this manner. Then, the third user can designate a position at which an object as a target is to be displayed by a dragging operation of moving a finger or the like on the touch panel 26 in a state in which the finger or the like is kept in contact with the touch panel 26. Here, the position mentioned is a line indicative of the locus along which the object as a target moves. In FIG. 13, an example of the locus of the dragging operation is represented by a solid line.

In the shooting game in the second example of utilization, the third user who operates the smartphone 20 would carry out inputting of a line representative of a locus of an object as a target to the touch panel 26 of the smartphone 20 while each of the first and second users who operate the controllers 18 controls the position of the aim for aiming at the object as a target through the controller 18.

It is to be noted that, in the following description, with regard to the play image 50 and the reduced inverted image 56, the rightward direction is defined as X-axis direction and the upward direction is defined as Y-axis direction. Further, the coordinate values of the left lower end point of the play image 50 are defined as (0, 0); the coordinate values of the right lower end portion of the play image 50 as (x3, 0); the coordinate values of the upper left end point of the play image 50 as (0, y3); and the coordinate values of the right upper point of the play image 50 as (x3, y3). Further, the coordinate values of the left lower end point of the reduced inverted image 56 is defined as (0, 0); the coordinate values of the right lower end point of the reduced inverted image 56 as (x4, 0); the coordinate values of the left upper point of the reduced inverted image 56 as (0, y4); and the coordinate values of the right upper end point of the reduced inverted image 56 as (x4, y4). Further, it is assumed that, in the second example of utilization, the picked up image 44, play image 50 and reduced inverted image 56 have an equal aspect ratio. It is to be noted that the picked up image 44, play image 50 and reduced inverted image 56 need not have an equal aspect ratio.

While the reduced inverted image 56 is displayed on the touch panel 26 of the smartphone 20 as seen in FIG. 13, if the third user carries out a dragging operation using a finger or the like and then removes the finger or the like from the touch panel 26, then the smartphone 20 produces and transmits input locus data to the game apparatus 12. Here, in the input locus data, elapsed periods of time from the point of time at which the dragging operation is started to the points of time at which positions are detected at predetermined time intervals by the touch panel 26 are associated with coordinate values of the positions detected by the touch panel 26. Thus, the operation signal acceptance section 34 of the game apparatus 12 receives the input locus data. Then, the process execution section 36 of the game apparatus 12 horizontally inverts the picked up image 44 and reduces the horizontally inverted picked up image 44 to produce a reduced inverted image 56 based on the latest picked up image 44 accepted from the stereo camera 16. Then, the process execution section 36 of the game apparatus 12 transmits the produced reduced inverted image 56 to the smartphone 20. Here, the process execution section 36 may horizontally invert the picked up image 44 and reduce the horizontally inverted picked up image 44 with its aspect ratio maintained to produce a reduced inverted image 56 to be transmitted to the smartphone 20. The smartphone 20 receives the reduced inverted image 56 and updates the image displayed on the touch panel 26 of the smartphone 20 to the received reduced inverted image 56.

The image displayed on the touch panel 26 of the smartphone 20 is successively updated in this manner.

When input locus data are received from the smartphone 20 in such a manner as described above, the process execution section 36 of the game apparatus 12 produces display locus data based on the input locus data and stores the display locus data into the storage section of the game apparatus 12. Here, the process execution section 36 converts, for example, the coordinate values (a3, b3) included in the input locus data into coordinate values (a3×x3/x4, b3×y3/y4) and multiplies the value of the elapsed time period associated with the coordinate value by a predetermined number such as, for example, three. It is to be noted here that the process execution section 36 may increase or decrease the value of the elapsed time period associated with the coordinate value at a magnification, for example, corresponding to a size ratio between the display unit 14 and the touch panel 26. Particularly, the process execution section 36 may multiply the value of the elapsed time period associated with the coordinate value, for example, by x3/x4 or by y3/y4.

Figure 14:
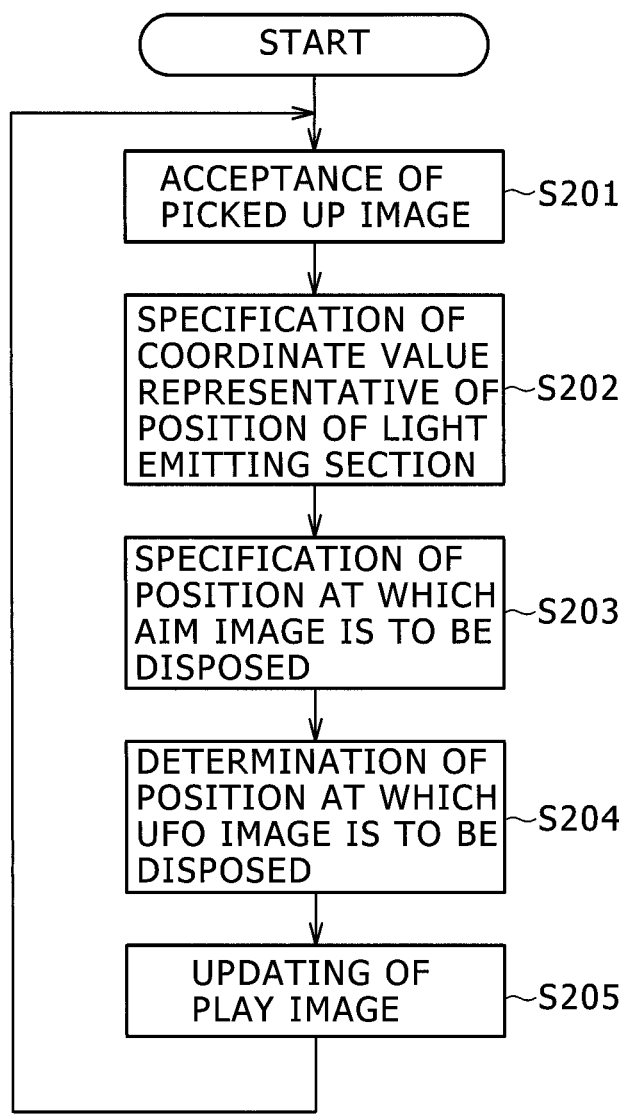
FIG. 14 is a flow chart illustrating another example of a flow of processing carried out by the game system of FIG. 1.

Here, an example of a flow of an updating process for the play image 50 carried out in the second example of utilization by the game system 10 according to the present embodiment is described with reference to a flow chart exemplified in FIG. 14.

First at step S201, the image acceptance section 30 of the game apparatus 12 accepts a picked up image 44 from the stereo camera 16. Then, the process execution section 36 specifies coordinate values representative of a position of the light emitting section 24 of the controller 18 in the accepted picked up image 44 at step S202. In the present processing example, coordinate values representative of the position of the light emitting section 24 for red and coordinate values representative of the position of the light emitting section 24 for blue are specified.

Then at step S203, the process execution section 36 specifies a position in the play image 50 at which the aim image 54 is to be disposed based on the coordinate values specified by the process at step S202. In the present example of processing, the process execution section 36 determines the position of the aim image 54 in the following manner in accordance with a rule determined in advance. In particular, for example, as the position of the light emitting section 24 in the picked up image 44 is displaced leftwardly, the position of the aim image 54 in the play image 50 is displaced rightwardly. Further, as the position of the light emitting section 24 in the picked up image 44 is displaced upwardly, the position of the aim image 54 in the play image 50 is displaced upwardly. Further, in the present example of processing, the position of the aim image 54 corresponding to the controller 18 of the first user and the position of the aim image 54 corresponding to the controller 18 of the second user are determined.

More particularly, for example, the process execution section 36 uses a known face image recognition technique to specify the positions of images of the faces of the first user and the second user in the picked up image 44. Then, the process execution section 36 sets a detection region, which is occupied by a reduced shape of the picked up image 44, to a position displaced by a predetermined length in the Y-axis negative direction from the specified images of the faces. Here, the process execution section 36 may set, for example, a region occupied by a shape of the picked up image 44 reduced with an aspect ratio maintained as a detection region. Then, the process execution section 36 determines the position of the aim image 54 such that the position of the light emitting section 24 in the detection region and the position of a representative point such as, for example, the center of gravity in the aim image 54 when the detection region is horizontally inverted and expanded to the size of the play image 50. Here, for example, the position of the left lower aim image 54 shown in FIG. 11 is determined as the position of the aim image 54 associated with the first user, and the position of the right upper aim image 54 shown in FIG. 11 is determined as the position of the aim image 54 associated with the second user.

Then, the process execution section 36 determines, at step S204, a position in the play image 50 at which the UFO image 52 is to be disposed based on the display locus data stored in the storage section of the game apparatus 12. In the present example of processing, the process execution section 36 determines coordinate values of the display locus data associated with an elapsed period of time from the point of time at which the UFO image 52 displayed on the display unit 14 is displayed on the display unit 14 as the coordinate values of the position at which the UFO image 52 is to be disposed. It is to be noted that, if display locus data including an elapsed period of time after the point of time at which the UFO image 52 displayed on the display unit 14 is displayed on the display unit 14 are not available, then the process execution section 36 carries out interpolation using coordinates associated with elapsed periods of time around the elapsed period of time to calculate a coordinate value and determines the calculated coordinate value as the coordinate value of the position at which the UFO image 52 is to be disposed.

It is to be noted that, in the present example of processing, if a coordinate value associated with an elapsed period of time having the highest value in the display locus data is determined, then the process execution section 36 deletes the display locus data from the storage section.

Then, the process execution section 36 disposes the aim image 54, in the present example of processing, the two aim images 54, and the UFO image 52 on the image obtained by horizontally inverting the picked up image 44 acquired by the process at step S201 and then enlarging or reducing the horizontally inverted image in response to the resolution of the display unit 14. In particular, the aim images 54 are disposed at the positions determined by the process at step S203, and the UFO image 52 is disposed at the position determined by the process at step S204. Then, the process execution section 36 updates the image to be displayed on the display unit 14 to the produced play image 50 at step S205. Thereafter, the processes at the steps beginning with step S201 are executed again.

The play image 50 is updated at predetermined intervals of time in such a manner as described above.

It is to be noted that, if display locus data are deleted by the process at step S204 in the processing example described above, then when the process at step S204 is to be executed, the process execution section 36 determines coordinate values associated with an elapsed period of time which has the value of 0 in the display locus data produced next to the deleted display locus data as the coordinate values of the position at which the UFO image 52 is to be disposed.

In the present example of processing, the UFO image 52 moves along a locus similar to the locus inputted to the touch panel 26 of the smartphone 20. Further, the value of an elapsed period of time included in the display locus data is as high as three times a value of the elapsed period of time associated with coordinate values included in the input locus data. Therefore, in comparison with an alternative case in which a value of an elapsed period of time included in the input locus data is used as it is as a value of the elapsed period of time included in the display locus data, the UFO image 52 moves at a speed as low as one third in the play image 50. In FIG. 11, a locus along which the UFO image 52 moves in the play image 50 is indicated by a broken line.

Here, if the first user or the second user depresses a predetermined button of the controller 18 associated with an attack to the target in the shooting game, then the controller 18 transmits an operation signal representing that the button is depressed to the game apparatus 12. Consequently, the operation signal acceptance section 34 of the game apparatus 12 receives the operation signal. Then, the process execution section 36 of the game apparatus 12 carries out a success/failure decision of the attack. The process execution section 36 decides, for example, that the attack of the user associated with the aim image 54 results in success if at least part of the aim image 54 corresponding to the controller 18 of the transmission source of the operation signal overlaps with at least part of the UFO image 52 in the play image 50 displayed on the display unit 14 when the operation signal is received. In any other case, the process execution section 36 decides that the attack results in failure.

Then, the process execution section 36 executes a process in response to the success or failure of the attack. For example, if it is decided that the attack results in success, then the process execution section 36 increments the value of data stored in advance in the storage section of the game apparatus 12 and representative of a score in the shooting game of the user whose attack is decided to result in success by a predetermined value.

In the game system 10 in the second example of utilization, the users can enjoy the shooting game in such a manner as described above.

Further, in the second example of utilization, an image similar to the image displayed on the display unit 14 is displayed also on the touch panel 26 of the smartphone 20. Then, if the user of the touch panel 26 carries out a dragging operation for inputting a line indicative of a locus on the image displayed on the touch panel 26, then a moving picture illustrating a manner in which an object such as the UFO image 52 moves along a locus in the image displayed on the display unit 14 associated with the position of the line inputted by the user in the touch panel 26 is displayed on the display unit 14. In this manner, in the second example of utilization, an image in which an object is disposed at a position in the display unit 14 associated with the position inputted for an image displayed on the touch panel 26 is displayed on the display unit 14.

It is to be noted that, in the second example of utilization, for example, the process execution section 36 may execute a process in accordance with the value of data representative of the score described above such as a process of controlling so that the play image 50 obtained by processing an image of the face of the user is displayed on the display unit 14. In particular, the process execution section 36 may specify a color of the light emitting section 24 of the controller 18 operated by a user whose value of the data representative of a score is highest. Then, the process execution section 36 may specify the position in the play image 50 at which the light emitting section 24 of the specified color is disposed. Further, the process execution section 36 may use a known face image recognition technique to specify an image of the user disposed above the position of the specified light emitting section 24 in the play image 50. More particularly, the process execution section 36 may execute a face image recognition process, for example, for a region of a predetermined shape such as a rectangular shape centered at a position spaced upwardly by a predetermined length from the position of the specified light emitting section 24 to specify an image of the face of the user. Then, the process execution section 36 may set a region of a predetermined shape such as, for example, a rectangular shape centered at a position spaced by a predetermined length in a predetermined direction such as, for example, in an upward direction from a representative point such as, for example, the center of gravity in the region of the image of the specified face of the user. Then, the process execution section 36 may update the play image 50 displayed on the display unit 14 such that a predetermined image such as, for example, an image of a crown representing that the value of the data representative of a score is the highest is disposed in the set display region. Similarly, the process execution section 36 may update the play image 50 displayed on the display unit 14 such that a predetermined image representing that the value of the data representative of a score is the lowest is disposed in the display region set on the image of the face of the user with regard to whom the value of the data representative of a score is the lowest. As described above, in the second example of utilization, a face image recognition process may be executed in a region which has a predetermined positional relationship with the light emitting section 24, or a region having a predetermined positional relationship with an image of the face of a user may be set as a display region such that an image is disposed in the display region.

Further, in the second example of utilization, the process execution section 36 of the game apparatus 12 may produce, in place of transmitting a picked up image 44 to the smartphone 20 in response to reception of input locus data, a reduced inverted image 56 and transmit the produced reduced inverted image 56 to the smartphone 20. In this instance, the reduced inverted image 56 may be provided based on the latest picked up image 44 from among the picked up images 44 accepted from the stereo camera 16 at predetermined time intervals such as, for example, at distances of one second or 1/60 second. Then, the smartphone 20 may update the image to be displayed on the touch panel 26 to the received reduced inverted image 56 in response to the reception of the reduced inverted image 56. By the configuration just described, a moving image similar to the moving image displayed on the display unit 14 but smaller in size than the moving image is displayed on the touch panel 26.

Further, when the moving image described above is displayed on the touch panel 26, the image displayed on the touch panel 26 may be inhibited from updating within a period from a timing at which a dragging operation on the touch panel 26 by the third user is started to another timing at which the dragging operation is ended. The period mentioned is a period from a timing at which a finger or the like is brought into contact with the touch panel 26 to another timing at which the finger or the like is brought out of contact with the touch panel 26. In other words, within the period described above, the smartphone 20 may stop the updating process of the image to be displayed on the touch panel 26.

Further, in the second example of utilization, in the process at step S203 described hereinabove, the position of the aim image 54 may be determined such that the position of the light emitting section 24 in the picked up image 44 and the position of a representative point such as, for example, the center of gravity in the aim image 54 when the picked up image 44 is horizontally inverted and expanded or reduced to the size of the play image 50 coincide with each other. Further, the process execution section 36 may determine the position of an object such as, for example, the aim image 54 disposed on the play image 50 based on the position of the controller 18 and an operation for the controller 18 or a posture of the controller 18 such as an inclination or an angular velocity of the controller 18. In particular, for example, in the process at step S201 described hereinabove, the image acceptance section 30 of the game apparatus 12 may accept a picked up image 44 from the stereo camera 16 and the operation signal acceptance section 34 may accept a result of measurement of the angular velocity by the gyro sensor from the controller 18. Then, in the process at step S203 described hereinabove, the process execution section 36 may determine the position of the reference point such that the position of the light emitting section 24 in a detection region or the picked up image 44 and the position of the reference point when the detection region or the picked up image 44 is horizontally inverted and then expanded to the size of the play image 50 coincide with each other. Then, the process execution section 36 may determine a position when the position of the reference point is moved by a correction amount determined based on a result of measurement of the angular velocity by the gyro sensor as the position of the aim image 54. The position mentioned is, for example, a position when the position of the reference point is moved by a length which increases in proportion to the size of the vector of the angular velocity along the direction of the vector of the angular velocity which is a result of the measurement by the gyro sensor.

Further, in the second example of utilization, the process execution section 36 of the game apparatus 12 may transmit the picked up image 44, an image obtained by horizontally inverting the picked up image 44, an image obtained by reducing the picked up image 44 or a like image to the smartphone 20 in place of the reduced inverted image 56. Then, the smartphone 20 may produce a reduced inverted image 56 based on the received image.

Further, for example, the smartphone 20 may produce display locus data based on input locus data and transmit the display locus data to the game apparatus 12. Then, the game apparatus 12 may store the received display locus data into the storage section of the game apparatus 12.

Third Example of Utilization

In the following, a third example of utilization of the game system 10 according to the present embodiment is described.

In the third example of utilization, the image acceptance section 30 of the game apparatus 12 accepts a picked up image 44 (refer to FIG. 15) from the stereo camera 16.

Figure 15:
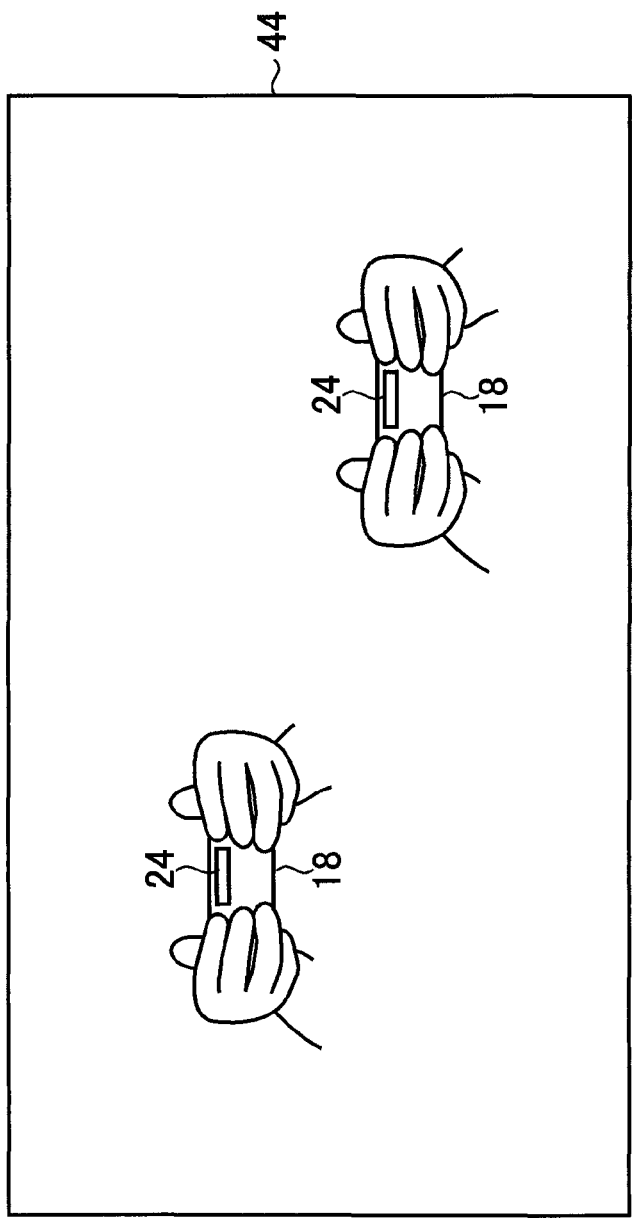
FIG. 15 is a schematic view showing a further example of a picked up image.

FIG. 15 illustrates an example of the picked up image 44 in the third example of utilization. It is to be noted that the picked up image 44 corresponds to the reference image described hereinabove. Whichever one of an image picked up by the imaging section disposed on the left side of the stereo camera 16 and another image picked up by the imaging section disposed on the right side of the stereo camera 16 may be used as the picked up image 44. In FIG. 15, images of the two controllers 18 and only images of the hands of the users who operate the controllers 18 are shown while images other than the images are omitted. However, the picked up image 44 includes also images of the face of the users, images of the body of the users, an image of the background and so forth. As shown in FIG. 15, the picked up image 44 includes an image of the light emitting section 24 of controllers 18. In the third example of utilization, the light emitting sections 24 emit light of colors different from each other.

Figure 16:
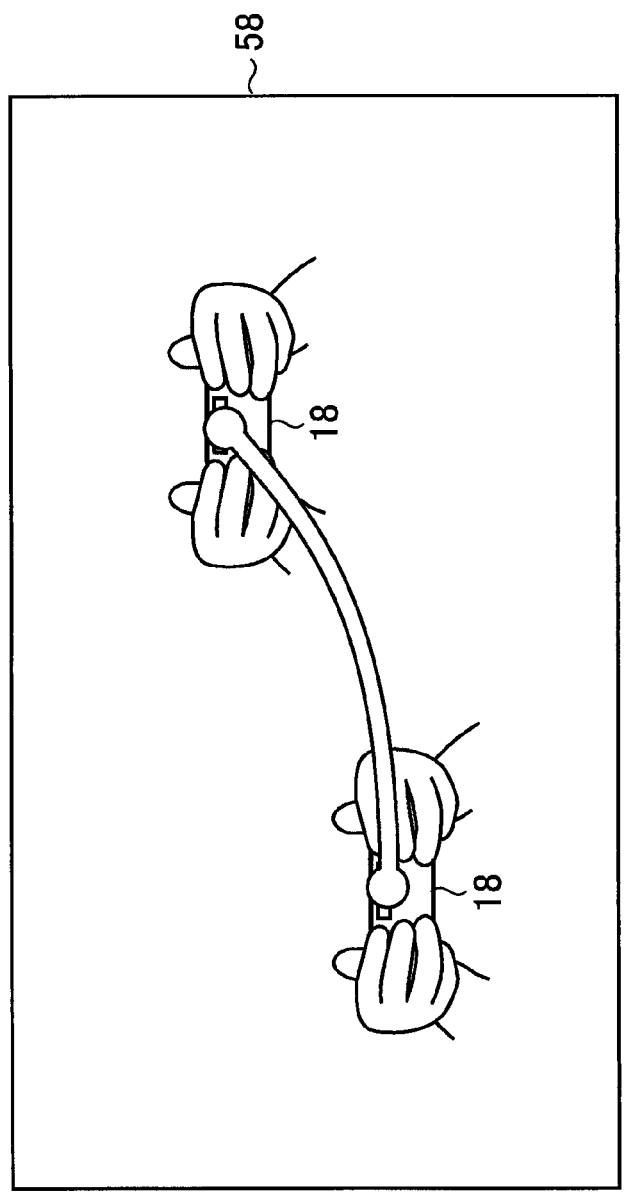
FIG. 16 is a schematic view showing an example of a display target image.

In the third example of utilization, the process execution section 36 produces an image by horizontally inverting the picked up image 44 and then expanding or reducing the horizontally inverted picked up image 44 in response to the resolution of the display unit 14 as an intermediate image. Here, the process execution section 36 may produce an image by horizontally inverting the picked up image 44 and then expanding or reducing the horizontally inverted picked up image 44 in response to the resolution of the display unit 14 with the aspect ratio maintained as an intermediate image. Then, the process execution section 36 specifies the position of the light emitting section 24 in the intermediate image. Then, the process execution section 36 produces an image in which a graphic interconnecting the specified positions of the light emitting sections 24 (such as a graphic of a string) is disposed on the intermediate image as a display target image 58. Then, the process execution section 36 controls so that the produced display target image 58 is displayed on the display unit 14 (refer to FIG. 16). FIG. 16 shows an example of the display target image 58.

In the third example of utilization, the game apparatus 12 executes the processes from acceptance of a picked up image 44 to the display control of a display target image 58 described hereinabove at intervals of imaging or production of the picked up image 44 by the stereo camera 16. Therefore, the positions of the graphic which interconnects the positions of the light emitting sections 24 is changed at the intervals of imaging or production of the picked up image 44 by the stereo camera 16.

Figure 17:
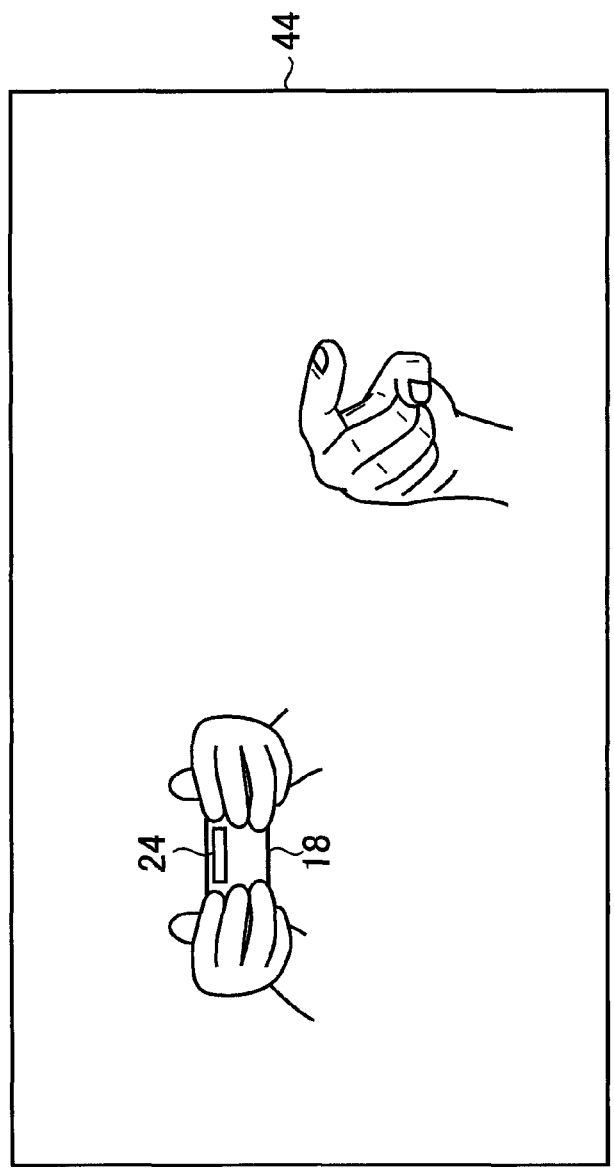
FIG. 17 is a schematic view showing a still further example of a picked up image.
Figure 18:
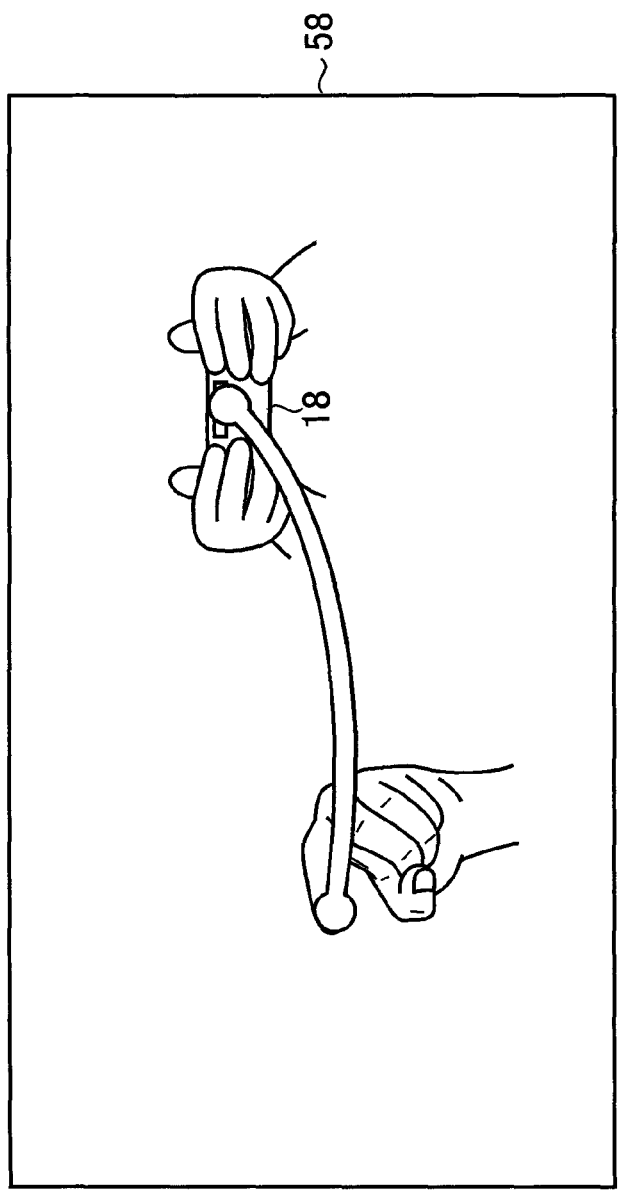
FIG. 18 is a schematic view showing another example of a display target image.

It is to be noted that the picked up image 44 may include an image of a controller 18, and an image of a hand whose finger is protruded, for example, as shown in FIG. 17. Further, the process execution section 36 may produce an image by horizontally inverting the picked up image 44 and then expanding or reducing the horizontally inverted picked up image 44 in response to the resolution of the display unit 14 as an intermediate image. Here, the process execution section 36 may produce an image by horizontally inverting the picked up image 44 and then expanding or reducing the horizontally inverted picked up image 44 in response to the resolution of the display unit 14 with the aspect ratio maintained as an intermediate image. Then, the process execution section 36 may use a known peak detection technique to specify the position of a peak such as, for example, a tip end of the forefinger in the intermediate image based on a distance distribution indicated by distance distribution data. Then, the process execution section 36 may produce an image in which a graphic which interconnects the specified position of the peak and the position of the light emitting section 24 of the controller 18 on the intermediate image as a display target image 58. FIG. 18 shows an example of the display target image 58 produced in such a manner as just described.

Figure 19:
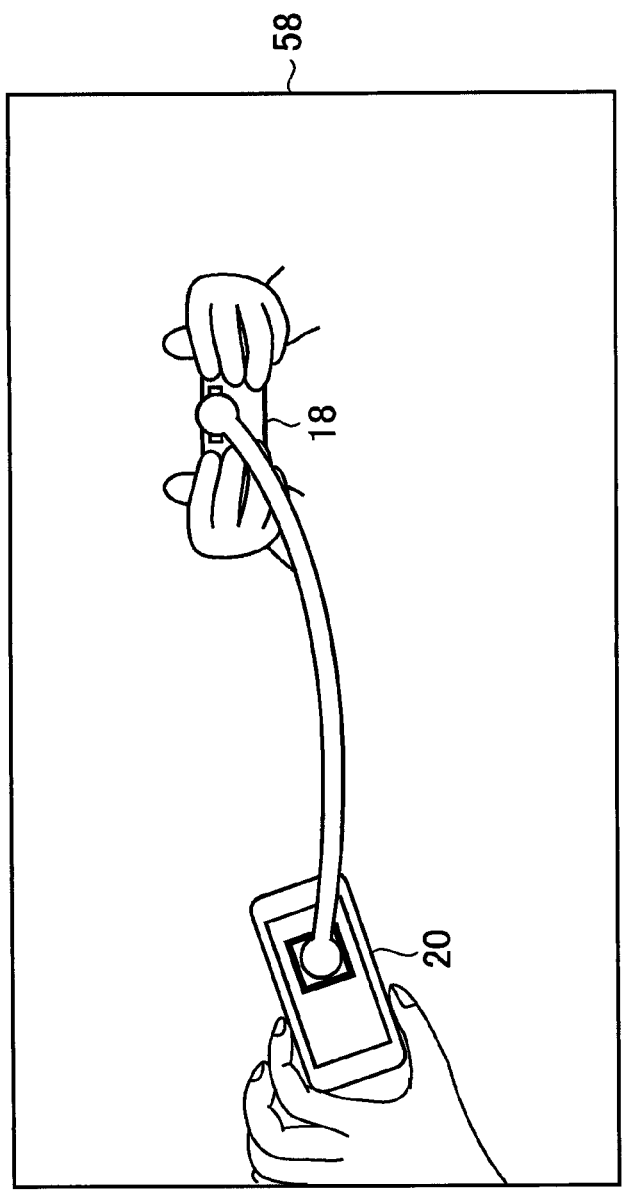
FIG. 19 is a schematic view showing a further example of a display target image.

Further, for example, the picked up image 44 may include an image of a controller 18 and an image of a smartphone 20 having a predetermined image such as, for example, the code image 42 displayed on the touch panel 26. Further, the process execution section 36 may produce an image by horizontally inverting the picked up image 44 and then expanding or reducing the horizontally inverted picked up image 44 in response to the resolution of the display unit 14 as an intermediate image. Here, the process execution section 36 may produce an image, for example, by horizontally inverting the picked up image 44 and then expanding or reducing the horizontally inverted picked up image 44 in response to the resolution of the display unit 14 with the aspect ratio maintained as an intermediate image. Then, the process execution section 36 may specify, for example, the position of a representative point such as, for example, the center of gravity in the code image 42 and the position of the light emitting section 24 of the controller 18 in the intermediate image. Thus, the process execution section 36 produces an image in which a graphic which interconnects the specified position of the representative point in the code image 42 and the specified position of the light emitting section 24 is disposed as a display target image 58. Further, the process execution section 36 controls so that the display target image 58 is displayed on the display unit 14 (refer to FIG. 19). FIG. 19 shows an example of the display target image 58 produced in such a manner as just described.

The process execution section 36 may execute processes similar to those described above to produce, for example, a display target image 58 in which a graphic which interconnects the specified position of the peak and the position of the image displayed on the touch panel 26 of the smartphone 20 is disposed.

With the third example of utilization, a process in accordance with a combination of a plurality of positions of different controllers 18 is carried out. Further, with the third example of utilization, also a process in accordance with a combination of the positions of various different terminals such as the smartphone 20 and the positions of the controllers 18 can be executed. Further, with the third example of utilization, also a process in accordance with the detected position of a peak such as a protruded finger of a user and the detected position of an apparatus such as the controller 18 or the smartphone 20 can be executed.

Fourth Example of Utilization

In the following, a fourth example of utilization of the game system 10 according to the present embodiment is described.

In the fourth example of utilization, the game apparatus 12 executes a game program of a game of a match-up type such as, for example, an air hockey game wherein the controllers 18 are used as operation inputting apparatus.

Figure 20:
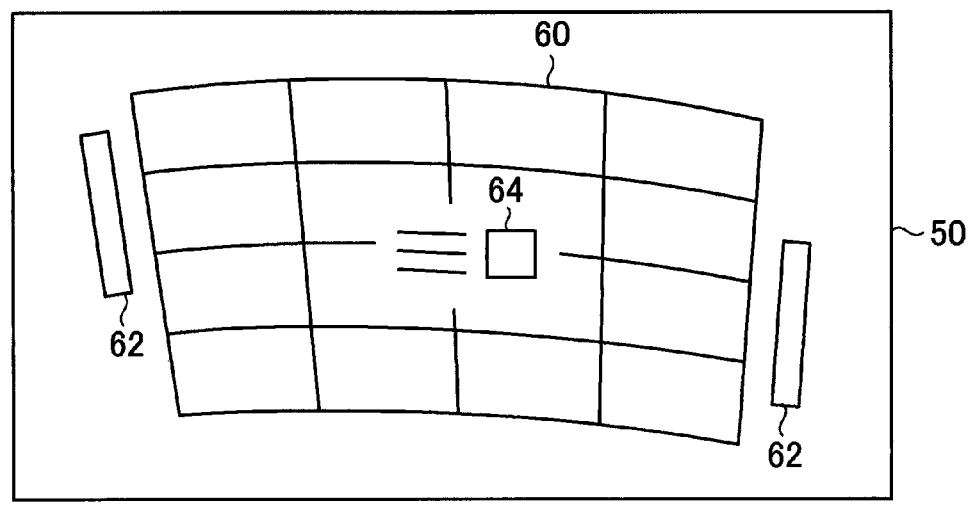
FIG. 20 is a schematic view showing another example of a play image.
Figure 21:
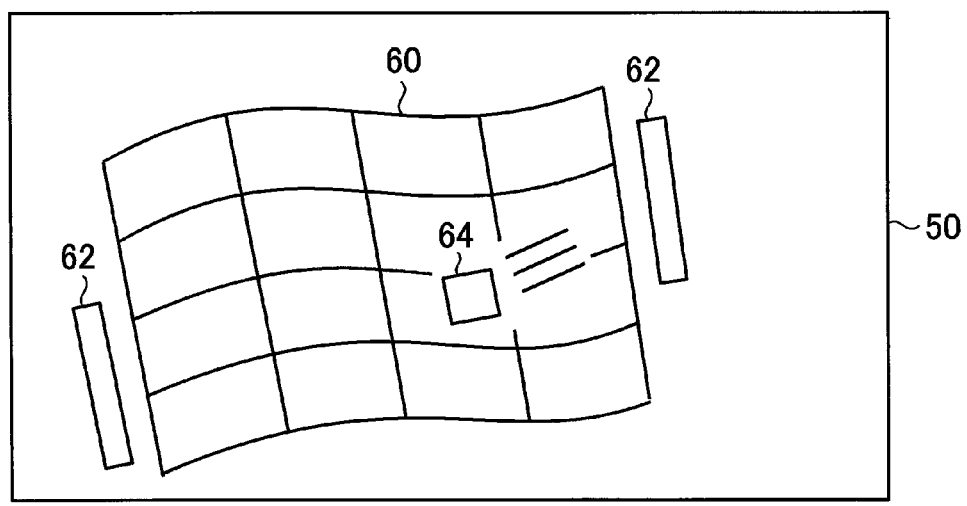
FIG. 21 is a schematic view showing a further example of a play image.

FIG. 20 shows an example of an image displayed on the display unit 14 during play of the air hockey game. Such an image as just described is hereinafter referred to as play image 50 in the fourth example of utilization. FIG. 21 shows another example of the play image 50 displayed on the display unit 14 during play of the air hockey game. The play image 50 includes a field image 60 representative of the field of the air hockey, two bar images 62 representative of bars for being individually operated by two users, and a puck image 64 representative of a puck which is hit back by the two users.

In the air hockey game, the two users hit back the puck represented by the puck image 64. The bar images 62 individually associated with the two users can be operated by a touch sensor provided in the controllers 18. Further, in response to a change in position and direction of the controllers 18 held by the two users, the position, size and shape of the field image 60 change. In the present embodiment, the bar image 62 corresponding to the user on the left side facing the display unit 14 is disposed on the left side, and the bar image 62 corresponding to the user on the right side facing the display unit 14 is disposed on the right side. Further, the color around the bar image 62 corresponding to the user on the left side facing the display unit 14 is a color of the same strain as the color of light emitted from the light emitting section 24 of the controller 18 operated by the user on the left side facing the display unit 14. Meanwhile, the color around the bar image 62 corresponding to the user on the right side facing the display unit 14 is a color of the same strain as the color of light emitted from the light emitting section 24 of the controller 18 operated by the user on the right side facing the display unit 14.

In the present air hockey game, if one of the users carries out a predetermined starting operation, then the puck represented by the puck image 64 is shot at a predetermined speed from the bar represented by the bar image 62 corresponding to the user similarly as in a known air hockey game. The starting operation may be, for example, depression of a predetermined button provided on the controller 18 of the user. Here, in the fourth example of utilization, the puck image 64 moves in accordance with the coordinate system of the field image 60. In the present air hockey game, since the shape and so forth of the field image 60 are changed by movement of the controller 18 by the user, the puck which moves in the play image 50 moves irregularly in comparison with that in a conventional air hockey game.

Then, by the upper side and the lower side of the field image 60 and the bars represented by the bar images 62, the puck represented by the puck image 64 is reflected. When the bar represented by the bar image 62 and the puck represented by the puck image 64 are brought into contact with each other, if the bar is moving in a direction toward the puck, then the puck is accelerated. On the other hand, when the bar represented by the bar image 62 and the puck represented by the puck image 64 are brought into contact with each other, if the bar is moving in a direction away from the puck, then the puck is decelerated.

In the following, processing executed at intervals of acceptance of a picked up image 44 by the image acceptance section 30 in the fourth example of utilization is described.

First, the image acceptance section 30 accepts a picked up image 44 which includes an image of the light emitting section 24 of a controller 18 held by each of two users and is similar to that in the third example of utilization. The two light emitting sections 24 are set in advance such that they emit light of colors different from each other. Further, the operation signal acceptance section 34 accepts, from each of the two controllers 18, a result of measurement of the acceleration sensor provided in the controller 18, a result of measurement of the gyro sensor provided in the controller 18, a result of detection of an object such as a finger by the touch sensor provided in the controller 18, and so forth.

Then, the process execution section 36 specifies the position of the two light emitting sections 24 in an image obtained by horizontally inverting the picked up image 44 and then expanding or reducing the horizontally inverted picked up image 44 in response to the resolution of the display unit 14. Here, the process execution section 36 may specify the position of the two light emitting sections 24 in an image obtained by horizontally inverting the picked up image 44 and then expanding or reducing the horizontally inverted picked up image 44 with the aspect ratio maintained in response to the resolution of the display unit 14. Further, the process execution section 36 specifies the direction of each of the two controllers 18 based on the result of measurement of the acceleration sensor provided in the controllers 18 and the result of measurement of the gyro sensor provided in the controllers 18, accepted from the controllers 18.

Then, the process execution section 36 determines the position, shape and size of the field image 60 in the play image 50 based on the specified positional relationship of the light emitting sections 24 of the two controllers 18 and the directions of the two controllers 18.

In the present embodiment, for example, if the controller 18 of the user on the left side facing the display unit 14 is inclined in the counterclockwise direction, then the direction toward the upper left from the lower right is determined as the direction of the left side of the field image 60. However, if the controller 18 of the user on the left side is inclined in the clockwise direction, then the direction toward the upper right from the lower left is determined as the direction of the left side of the field image 60. On the other hand, if the controller 18 of the user on the right side facing the display unit 14 is inclined in the counterclockwise direction, then the direction toward the upper left from the lower right is determined as the direction of the right side of the field image 60. However, if the controller 18 of the user on the right side is inclined in the clockwise direction, then the direction toward the upper right from the lower left is determined as the direction of the right side of the field image 60.

The position of the left side of the field image 60 in the play image 50 is determined such that it is displaced leftwardly as the position of the controller 18 of the user on the left side facing the display unit 14 is displaced leftwardly but is displaced rightwardly as the position of the controller 18 of the user on the left side is displaced rightwardly. Meanwhile, the position of the right side of the field image 60 in the play image 50 is determined such that it is displaced leftwardly as the position of the controller 18 of the user on the right side facing the display unit 14 is displaced leftwardly but is displaced rightwardly as the position of the controller 18 of the user on the right side is displaced rightwardly.

Then, the process execution section 36 determines a curved line or a straight line which smoothly interconnects the upper end of the left side and the upper end of the right side of the field image 60 as a line representative of the upper side of the field image 60. Further, the process execution section 36 determines a curved line or a straight line which interconnects the lower end of the left side and the lower end of the right side of the field image 60 as a line representative of the lower side of the field image 60.

Further, the process execution section 36 determines a new position of the bar image 62 based on a result of detection of an object such as a finger by the touch sensor provided in the controller 18. In the present embodiment, for example, if a result of detection indicating that an operation of dragging in an upward direction on the touch sensor is carried out is accepted from the controller 18 of the user on the left side facing the display unit 14, then the process execution section 36 determines a new position of the bar image 62 disposed on the left side in the play image 50 so that the position on the left side of the field image 60 may be displaced upwardly by a predetermined value. However, if a result of detection indicating that an operation of dragging in a downward direction on the touch sensor is carried out is received, then the process execution section 36 determines a new position of the bar image 62 disposed on the left side in the play image 50 so that the position on the left side of the field image 60 may be displaced downwardly by a predetermined value. On the other hand, if a result of detection indicating that an operation of dragging in an upward direction on the touch sensor is carried out is received from the controller 18 of the user on the right side facing the display unit 14, then the process execution section 36 determines a new position of the bar image 62 disposed on the right side in the play image 50 so that the position on the right side of the field image 60 may be displaced upwardly by a predetermined value. However, if a result of detection indicating that an operation of dragging in a downward direction on the touch sensor is carried out is received, then the process execution section 36 determines a new position of the bar image 62 disposed on the right side in the play image 50 so that the position on the right side of the field image 60 may be displaced downwardly by a predetermined value.

Then, the process execution section 36 determines a new position of the puck image 64 based on the position at present of the puck image 64 and the velocity vector of the puck represented by the puck image 64, the shape and so forth of the field image 60 and the position and so forth of the bar image 62.

Then, the process execution section 36 updates the image displayed on the display unit 14 to the play image 50 in which the field image 60, bar image 62 and puck image 64 whose position and so forth are determined in such a manner as described above.

In this manner, in the fourth example of utilization, the process execution section 36 determines a disposition, namely, a shape, position, size or the like, of an image, here, for example, the field image 60, of an object displayed on the display unit 14 based on at least one of the position and the posture of a plurality of controllers 18, here, of the two controllers 18. Further, the process execution section 36 determines for each of the controllers 18 a disposition of an image, here, for example, the bar image 62, of a different object displayed on the display unit 14 and associated with each of the controllers 18 based on an operation, here, a dragging operation on the touch sensor, for the controller 18. Or, as described above, the object relating to an outcome of the game, here, the field image 60, may be deformed based on the position of the controller 18 of each of the users who play against each other in the game, the distance between the controllers 18, the posture such as, for example, an angle of the controller 18 and so forth.

As described in the description of the first, second, third and fourth examples of utilization, with the game system 10 according to the present embodiment, even if an operation inputting apparatus such as the controller 18 or the smartphone 20 does not include an imaging section, a process in accordance with an operation carried out for the operation inputting apparatus and the position of the operation inputting apparatus can be executed. Further, with the game system 10 according to the present embodiment, even if an operation inputting apparatus such as the controller 18 or the smartphone 20 includes an imaging section, a process in accordance with an operation carried out for the operation inputting apparatus and the position of the operation inputting apparatus can be executed without using the imaging section.

It is to be noted that the present technology is not limited to the embodiment described above.

For example, the image acceptance section 30 of the game apparatus 12 may accept a picked up image 44 from a camera which is not the stereo camera 16.

Or, for example, the game apparatus 12 may accept a result of measurement of a distance distribution from a distance distribution measurement section. In this instance, the distance distribution measurement section outputs infrared rays and measures the period of time until the infrared rays return to the game apparatus 12 after they are reflected by an imaging object. Then, the distance distribution measurement section measures a distance distribution between the imaging object and the game apparatus 12 based on the measured time periods.

Or, for example, the game apparatus 12 may accept a result of measurement of a distance distribution from a distance distribution measurement section configured from a plurality of lenses having different focal lengths from each other. In this instance, the distance distribution measurement section measures the distance distribution between the imaging object and the game apparatus 12 based on one of the lenses which is focused on the imaging object.

Further, the distance distribution data production section 32 of the game apparatus 12 may produce distance distribution data based on the received result of measurement.

Further, the present embodiment may be applied not only to the game system 10 which includes the game apparatus 12 but also to general information processing systems which include an information processing apparatus and so forth.

Further, the particular character strings and numerical values given hereinabove and particular character strings in the drawings are illustrative, and character strings, numerical values and so forth applicable in the present technology are not limited to such character strings and numerical values.

The present disclosure contains subject matter related to that disclosed in Japanese Priority Patent Application JP 2012-244921 filed in the Japan Patent Office on Nov. 6, 2012, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus, comprising:

an image acceptance section configured to accept an image of an operation inputting apparatus and a user thereof, wherein said image is picked up by a stereo camera comprising a left side imaging section and a right side imaging section, each configured to pick up an image individually, wherein the picked up image by one of the left and right side imaging sections corresponds to a reference image, and the picked up image by the other one of the left and right side imaging sections corresponds to a comparison image, such that the position of an imaging object in the reference image and the imaging object in the comparison image are displaced from each other by a parallax between the two imaging sections, wherein said displacement is used to specify the distance from the stereo camera to the imaging object, said operation inputting apparatus comprising a light emitting section;

an operation signal acceptance section configured to accept operation signals from the operation inputting apparatus; and a process execution section configured to execute a process in response to the position of the operation inputting apparatus in one of the reference image and the comparison image accepted by the image acceptance section and the operation signal accepted by the operation signal acceptance section, wherein said picked up image comprises an image of a user operating said operation inputting apparatus, wherein said process execution section produces a play image displayed on a display unit, said play image comprising the picked up image, a target object, and an aim image for aiming at and attacking said target object, said aim image responds to movement of said operation inputting apparatus, wherein as a position of said light emitting section in said picked up image is displaced leftwardly, a position of said aim image in said play image is displaced rightwardly, wherein said process execution section transmits a reduced inverted image of said picked up image to a smartphone configured to control said target object in response to user input, while said operation inputting apparatus is configured to control movement of said aim image in response to user input, wherein said smartphone includes a central processing unit which operates in accordance with a program installed in the smartphone, a storage, a network card, and a touch panel, wherein said smartphone touch panel is used to designate a position at which said target object is displayed by accepting a dragging operation as input on the touch panel, wherein said position is a line indicative of a locus of positions along which the target object moves, wherein a client program is transmitted to the smartphone in response to a download request from the smartphone and is installed on said smartphone thereby enabling use of said smartphone to control said target object in said play image.

2. The information processing apparatus according to claim 1, wherein the process execution section further
executes a process for controlling an image of an object detected by the stereo camera by horizontally inverting the image and resizing the image according to a resolution of a display unit, and transmitting the horizontally inverted and resized image to the display unit for display thereon.

3. The information processing apparatus according to claim 2, wherein the operation inputting apparatus comprises a touch panel, and
the operation signal acceptance section accepts, from the operation inputting apparatus, data representative of touch panel input, and
the process execution section generates and moves a target object based on the touch panel input, wherein the target object is displayed at a position in the image displayed on the display unit, the position being associated with a position indicated by the touch panel input.

4. The information processing apparatus according to claim 2, wherein the process execution section moves a target object in response to an inputting operation in the form of touch panel input, so that the target object moves along a locus of positions in the image displayed on the display unit, wherein the locus of positions is defined by positions indicated by the touch panel input.

5. The information processing apparatus according to claim 1, wherein
the image acceptance section accepts an image of the operation inputting apparatus having a touch panel on which a predetermined image is displayed;
the process execution section specifies the position of the predetermined image in the image accepted by the image acceptance section;
the process execution section controls so that, after the position of the predetermined image is specified, an image for prompting an operation is displayed on the touch panel of the operation inputting apparatus;
the operation signal acceptance section accepts an operation signal representative of an operation for the image for prompting an operation displayed on the touch panel from the operation inputting apparatus; and
the process execution section executes a process in response to the specified position of the predetermined image and the accepted operation signal.

6. The information processing apparatus according to claim 1, wherein
the image acceptance section accepts an image of the operation inputting apparatus having the light emitting section;
the operation signal acceptance section accepts an operation signal representative of an operation for the operation inputting apparatus; and
the process execution section executes a process in response to the position of the light emitting section in the image accepted by the image acceptance section and the operation signal.

7. The information processing apparatus according to claim 6, wherein
the image acceptance section accepts an image of a plurality of different operation inputting apparatus having light emitting sections emitting light of colors different from each other;
the operation signal acceptance section accepts operation signals representative of operations for the operation inputting apparatus associated with identification information of the operation inputting apparatus from the operation inputting apparatus; and
the process execution section executes a process in response to the operation signal and the position of the light emitting section of the color associated with the operation inputting apparatus of an outputting source of the operation signal in the image accepted by the image acceptance section.

8. The information processing apparatus according to claim 1, wherein
the image acceptance section accepts an image of a plurality of different operation inputting apparatus;
the operation signal acceptance section accepts operation signals associated with identification information from each of the plurality of different operation inputting apparatus and representative of operations for the plurality of different operation inputting apparatus; and
the process execution section executes a process for controlling such that an image positioned within the play image based on at least one of the operation signals and associated with at least one of the plurality of different operation inputting apparatus and an image corresponding to a relationship regarding at least one of the position and the posture between the plurality of different operation inputting apparatus in the one of the reference image and comparison image accepted by the image acceptance section are displayed on the display unit.

9. The information processing apparatus according to claim 1, wherein said play image comprises an image obtained by horizontally inverting said picked up image and resizing the horizontally inverted picked up image in response to the resolution of a display unit.

10. The information processing apparatus according to claim 1, wherein said picked up image comprises an image of a plurality of users operating a plurality of operation inputting apparatus, wherein each operation inputting apparatus in said picked up image controls a corresponding aim image in said play image.

11. An information processing system, comprising:
an information processing apparatus; and
a plurality of operation inputting apparatus,
each operation inputting apparatus includes a light emitting section emitting light of a color different from each other,
the information processing apparatus including
an image acceptance section configured to accept an image picked up by a stereo camera of the plurality of different operation inputting apparatus, said stereo camera comprising a left side imaging section and a right side imaging section, each configured to pick up an image individually, wherein the picked up image by one of the left and right side imaging sections corresponds to a reference image, and the picked up image by the other one of the left and right side imaging sections corresponds to a comparison image, such that the position of an imaging object in the reference image and the imaging object in the comparison image are displaced from each other by a parallax between the two imaging sections, wherein said displacement is used to specify the distance from the stereo camera to the imaging object, an operation signal acceptance section configured to accept an operation signal from each of said plurality of operation inputting apparatus, and a process execution section configured to execute a process in response to the respective operation signal and the respective position of the light emitting section of the color associated with each operation inputting apparatus in one of the reference image and the comparison image accepted by the image acceptance section, wherein said picked up image comprises an image of a plurality of users each operating one of said plurality of operation inputting apparatus, wherein said process execution section produces a play image displayed on a display unit, said play image comprising the picked up image, a target object, and a plurality of aim images for aiming at said target object, each aim image responds to movement of a corresponding one of said plurality of operation inputting apparatus, wherein as a position of any of said light emitting sections in said picked up image is displaced leftwardly, a position of the corresponding aim image in said play image is displaced rightwardly, wherein said process execution section transmits a reduced inverted image of said picked up image to a smartphone configured to control said target object in response to user input of a line representative of a locus of positions of the target object, while each operation inputting apparatus is configured to control movement of its corresponding aim image in response to user input, wherein said smartphone includes a central processing unit which operates in accordance with a program installed in the smartphone, a storage, a network card, and a touch panel, wherein said smartphone touch panel is used to designate a position at which said target object is displayed by accepting a dragging operation as input on the touch panel, wherein said position is a line indicative of the locus along which the target object moves, wherein a client program is transmitted to the smartphone in response to a download request from the smartphone and is installed on said smartphone thereby enabling use of said smartphone to control said target object in said play image.

12. The information processing system according to claim 11, wherein said plurality of different operation inputting apparatus each comprise a light emitting section that emits light of a different color than any of the other operation inputting apparatus, wherein the information processing apparatus detects the position of each operation inputting apparatus based on the position and the size of the light emitting section in the picked up image.

13. The information processing apparatus according to claim 12, wherein at least one of:

(i) as a position of said light emitting section in said picked up image is displaced leftwardly, a position of said aim image in said play image is displaced rightwardly, and (ii) as a position of said light emitting section in said picked up image is displaced upwardly, a position of said aim image in said play image is displaced upwardly.

14. The information processing apparatus according to claim 12, wherein a user attacks said target object by moving an aim image onto said target object and pressing a predetermined button, which sends an operation signal representing said button to said operation signal acceptance section, wherein when said operation signal is received by said operation signal acceptance section said process execution section determines whether said attack is successful by checking if at least part of the aim image overlaps with at least part of the target object in the play image displayed on the display unit.

15. An information processing method, comprising:

accepting an image of an operation inputting apparatus picked up by a stereo camera, said stereo camera comprising a left side imaging section and a right side imaging section, each configured to pick up an image individually, wherein the picked up image by one of the left and right side imaging sections corresponds to a reference image, and the picked up image by the other one of the left and right side imaging sections corresponds to a comparison image, such that the position of an imaging object in the reference image and the imaging object in the comparison image are displaced from each other by a parallax between the two imaging sections, wherein said displacement is used to specify the distance from the stereo camera to the imaging object;

accepting an operation signal representative of an operation for the operation inputting apparatus from the operation inputting apparatus, said operation inputting apparatus comprising a light emitting section;

executing a process in response to the position of the operation inputting apparatus in the accepted one of the reference image and the comparison image, and the accepted operation signal, wherein said picked up image comprises an image of a user operating said operation inputting apparatus, producing a play image displayed on a display unit, said play image comprising the picked up image, a target object, and an aim image for aiming at said target object, said aim image responds to movement of said operation inputting apparatus, wherein as a position of said light emitting section in said picked up image is displaced leftwardly, a position of said aim image in said play image is displaced rightwardly, wherein said process execution section transmits a reduced inverted image of said picked up image to a smartphone configured to control said target object in response to user input, while said operation inputting apparatus is configured to control movement of said aim image, wherein said smartphone includes a central processing unit which operates in accordance with a program installed in the smartphone, a storage, a network card, and a touch panel, wherein said smartphone touch panel is used to designate a position at which said target object is displayed by accepting a dragging operation as input on the touch panel, wherein said position is a line indicative of a locus of positions along which the target object moves, wherein a client program is transmitted to the smartphone in response to a download request from the smartphone and is installed on said smartphone thereby enabling use of said smartphone to control said target object in said play image.

16. A non-transitory, computer readable information recording medium on or in which a program is recorded, the program causing a computer to function as:
- an image acceptance section configured to accept an image of an operation inputting apparatus picked up by a stereo camera, said stereo camera comprising a left side imaging section and a right side imaging section, each configured to pick up an image individually, wherein the picked up image by one of the left and right side imaging sections corresponds to a reference image, and the picked up image by the other one of the left and right side imaging sections corresponds to a comparison image, such that the position of an imaging object in the reference image and the imaging object in the comparison image are displaced from each other by a parallax between the two imaging sections, wherein said displacement is used to specify the distance from the stereo camera to the imaging object;
- an operation signal acceptance section configured to accept an operation signal from the operation inputting apparatus, said operation inputting apparatus comprising a light emitting section; and
- a process execution section configured to execute a process in response to the position of the operation inputting apparatus in one of the reference image and the comparison image accepted by the image acceptance section and the operation signal accepted by the operation signal acceptance section, wherein said picked up image comprises an image of a user operating said operation inputting apparatus, wherein said process execution section produces a play image comprising the picked up image, a target object, and an aim image for aiming at said target object, said aim image responds to movement of said operation inputting apparatus, wherein as a position of said light emitting section in said picked up image is displaced leftwardly, a position of said aim image in said play image is displaced rightwardly, wherein said process execution section transmits a reduced inverted image of said picked up image to a smartphone configured to control said target object in response to user input, while each operation inputting apparatus is configured to control movement of its corresponding aim image, wherein said smartphone includes a central processing unit which operates in accordance with a program installed in the smartphone, a storage, a network card, and a touch panel, wherein said smartphone touch panel is used to designate a position at which said target object is displayed by accepting a dragging operation as input on the touch panel, wherein said position is a line indicative of a locus of positions along which the target object moves, wherein a client program is transmitted to the smartphone in response to a download request from the smartphone and is installed on said smartphone thereby enabling use of said smartphone to control said target object in said play image.

* * * * *